(12) United States Patent
Schuster et al.

(10) Patent No.: US 10,540,363 B2
(45) Date of Patent: *Jan. 21, 2020

(54) SYSTEMS AND METHODS FOR PROVIDING PERFORMANCE METADATA IN INTEREST-DRIVEN BUSINESS INTELLIGENCE SYSTEMS

(71) Applicant: Workday, Inc., Pleasanton, CA (US)

(72) Inventors: John Schuster, Los Altos Hills, CA (US); Usman Ghani, San Mateo, CA (US); Brian F. Babcock, Mountain View, CA (US); Jenn Rhim, Belmont, CA (US); John Glenn Eshleman, Mountain View, CA (US); Peter Schlampp, Burlingame, CA (US)

(73) Assignee: Workday, Inc., Pleasanton, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/223,113

(22) Filed: Jul. 29, 2016

(65) Prior Publication Data

US 2017/0017703 A1 Jan. 19, 2017

Related U.S. Application Data

(63) Continuation of application No. 14/060,575, filed on Oct. 22, 2013, now Pat. No. 9,405,812.

(Continued)

(51) Int. Cl.
*G06F 16/00* (2019.01)
*G06F 16/25* (2019.01)

(Continued)

(52) U.S. Cl.
CPC ........ *G06F 16/254* (2019.01); *G06F 11/3006* (2013.01); *G06F 11/3409* (2013.01);

(Continued)

(58) Field of Classification Search
CPC ......... G06F 17/30563; G06F 17/30554; G06F 17/30536; G06F 17/30607;

(Continued)

(56) References Cited

U.S. PATENT DOCUMENTS 5,758,144 A * 5/1998 Eberhard ................ G06F 11/34
6,282,548 B1 8/2001 Burner (Continued)

OTHER PUBLICATIONS

Solomon Negash et al., "Business Intelligence", Ninth Americas Conference on Information Systems, 2003, pp. 3190-3199.*

*Primary Examiner* — Srirama Channavajjala
(74) *Attorney, Agent, or Firm* — Van Pelt, Yi & James LLP

(57) ABSTRACT

Interest-driven business intelligence server systems that provide performance metadata are described. In the disclosed embodiments, an interest-driven business intelligence server system receives a report specification. The report specification includes at least reporting data requirement. The interest-driven business intelligence server determines performance metadata information for an interest-driven data pipeline that is utilized to generate reporting data based on the report specification. The performance metadata information for the interest-driven data pipeline is transmitted to an interest-driven user visualization system by the interest-driven business intelligence server system.

14 Claims, 12 Drawing Sheets

Related U.S. Application Data

(60) Provisional application No. 61/717,096, filed on Oct. 22, 2012.

(51) Int. Cl.

| | | |
|---|---|---|
| *G06F 16/27* | (2019.01) | |
| *G06F 16/21* | (2019.01) | |
| *G06F 16/28* | (2019.01) | |
| *G06F 16/2458* | (2019.01) | |
| *G06F 11/34* | (2006.01) | |
| *G06F 11/30* | (2006.01) | |

(52) U.S. Cl.
CPC .......... *G06F 16/217* (2019.01); *G06F 16/219* (2019.01); *G06F 16/2462* (2019.01); *G06F 16/27* (2019.01); *G06F 16/283* (2019.01); *G06F 16/284* (2019.01); *G06F 11/3466* (2013.01)

(58) Field of Classification Search
CPC .......... G06F 17/30572; G06F 17/30592; G06F 17/30309; G06F 17/30398; G06F 16/254; G06F 16/289; G06F 16/2581; G06F 16/27; G06F 16/217; G06F 16/219; G06F 16/283–284; G06F 16/2462; G06F 11/3409; G06F 11/3006; G06F 11/3466; G06Q 10/063; G06Q 10/0639; G06Q 10/06375; G06Q 10/067; G06Q 30/02; G06Q 30/0201
See application file for complete search history.

(56) References Cited

U.S. PATENT DOCUMENTS

| | | | |
|---|---|---|---|
| 6,609,123 B1 | 8/2003 | Cazemier | |
| 6,842,758 B1 | 1/2005 | Bogrett | |
| 7,349,862 B2* | 3/2008 | Palmer | G06F 17/243 |
| | | | 705/7.29 |
| 7,565,335 B2* | 7/2009 | Tang | G06N 7/005 |
| | | | 706/20 |
| 8,068,986 B1 | 11/2011 | Shahbazi | |
| 8,165,146 B1 | 4/2012 | Melick | |
| 8,217,945 B1 | 7/2012 | Moscovici | |
| 8,738,565 B2* | 5/2014 | Cook | G06F 16/972 |
| | | | 707/602 |
| 8,996,463 B2* | 3/2015 | Merriman | G06F 16/244 |
| | | | 707/637 |
| 9,405,812 B2* | 8/2016 | Schuster | G06F 11/3409 |
| 2002/0059264 A1* | 5/2002 | Fleming | G06Q 40/02 |
| 2002/0107957 A1 | 8/2002 | Zargham | |
| 2004/0174397 A1* | 9/2004 | Cereghini | G06Q 30/02 |
| | | | 715/855 |
| 2005/0228728 A1* | 10/2005 | Stromquist | G06F 9/44505 |
| | | | 705/30 |
| 2007/0027904 A1 | 2/2007 | Chow | |
| 2008/0005677 A1* | 1/2008 | Thompson | G06Q 10/00 |
| | | | 715/744 |
| 2008/0059604 A1* | 3/2008 | Brunnabend | G06Q 10/00 |
| | | | 709/217 |
| 2008/0201653 A1 | 8/2008 | Khandekar | |
| 2009/0096812 A1* | 4/2009 | Boixel | G06Q 10/00 |
| | | | 345/646 |
| 2009/0172006 A1* | 7/2009 | Ducaule | G06Q 10/10 |
| 2010/0287106 A1* | 11/2010 | Halkus | G06Q 10/00 |
| | | | 705/301 |
| 2011/0131270 A1 | 6/2011 | Statchuk | |
| 2011/0246449 A1* | 10/2011 | Collins | G06F 17/30463 |
| | | | 707/715 |
| 2011/0261049 A1* | 10/2011 | Cardno | G06Q 10/10 |
| | | | 345/419 |
| 2011/0313969 A1* | 12/2011 | Ramu | G06F 16/254 |
| | | | 707/602 |
| 2014/0282184 A1* | 9/2014 | Dewan | G06F 3/0484 |
| | | | 715/771 |
| 2016/0246769 A1* | 8/2016 | Screen | G06F 17/243 |

* cited by examiner

705 — Chicago Employee Salary Lens panel

CHICAGO EMPLOYEE SALARY LENS
BUILT ON 4/16 4:20 PM

LENS DESCRIPTION — 708

710

715
ESTIMATED LENS SIZE ⇧ 400 MB
- LAST LENS BUILD SIZE — 350 MB
- MAXIMUM LENS SIZE ALLOWED — 2 GB 720
722

| | | |
|---|---|---|
| ⊚ MEASURE | ⇩ | 5 FIELDS |
| ▭ DIMENSION | ⇧ | 15 FIELDS |
| ▽ FILTER | 2 FILTERS (REDUCED THE SIZE BY 60%) | |

725  730  735

- INPUT DATA SIZE — 1GB
  (AFFECTS LENS BUILD TIME)

DEFINE FILTER ON DATE TO REDUCE THE INPUT DATASIZE
740

▽ FILTERS / LENS SIZE REDUCED BY 60%

| | |
|---|---|
| 🗓 DATE | ✎ ✕ |
| ▭ STATE | ✎ ✕ |

👥 PERMISSION SETTINGS 742
- SCHEDULING
- ADVANCED SETTING ACCESS POINT
- NOTIFICATION RULES

---

700 — Source Dataset panel

SOURCE DATASET
▦ CHICAGO EMPLOYEE SALARY                      1 GB

CHARACTERIZATION LAST COMPLETED: 4/15 2:20 PM

THIS DATASET IS A LISTING OF ALL CURRENT CITY OF CHICAGO EMPLOYEES, COMPLETE WITH FULL NAMES, DEPARTMENTS, POSITIONS, AND ANNUAL SALARIES. FOR HOURLY EMPLOYEES THE ANNUAL SALARY IS ESTIMATED.

745  750  755

| ALL AVAILABLE FIELDS | 120 | FIELDS ADDED TO LENS | 40 |
|---|---|---|---|

🔍 FIND FIELD    SORT BY : [ FIELD TYPE ▽ ]

▽ FOCUS DATASET                    + ADD ALL

| | | |
|---|---|---|
| ▭ STATE | | ≡ ▽ ⊞ |
| ▭ COUNT OF EMPLOYEES | | ≡ ▽ ⊞ |
| ▭ DISTINCT DEPARTMENTS | | ≡ ▽ ⊞ |
| ▭ DISTINCT TITLES | ⚙ 3 | ≡ ▽ ⊟ |
| ⊚ SUM OF SALARY | | ⊞ |
| 🗓 DATE | | ≡ ▽ ⊞ |
| ▭ EMPLOYEE SALARY | ⚙ 1 | ▽ ⊟ |
| ▭ NAME | | ≡ ▽ ⊞ |
| ▭ EMPLOYEE ID | ⚙ 2 | ≡ ▽ ⊟ |

▽ DEPARTMENTS, EMPLOYEE, MANAGER           + ADD ALL

| | |
|---|---|
| ▭ NAME | ≡ ▽ ⊞ |
| ▭ POSITION | ≡ ▽ ⊞ |
| ▭ DEPARTMENTS | ≡ ▽ ⊞ |
| ▭ REGION | ≡ ▽ ⊞ |

---

755 — Right panel

BASE DIMENSION
STATE
FILTER RECOMMENDED

NUMBER OF DISTINCT VALUES
35
— 760

ESTIMATED LENS SIZE IMPACT
20 MB
— 765

DATA DISTRIBUTION    [ EXAMPLE DATA ]

MAX: CA                          MIN: WA (bar chart, values 0–300,000; x-axis 0 2 4 6 8 10 12 14 16 18 20 22 24 26)

EXPRESSION
EXPRESSION EXPRESSION                770
EXPRESSION EXPRESSION
THIS IS A PLACEHOLDER TEXT.

DESCRIPTION
THE STATE OF THE AIRPORT

PATH
AIRPORTS . STATE

DEFAULT VALUE
N/A

FIG. 7

SYSTEMS AND METHODS FOR PROVIDING PERFORMANCE METADATA IN INTEREST-DRIVEN BUSINESS INTELLIGENCE SYSTEMS

CROSS-REFERENCE TO RELATED APPLICATIONS

The current application is a continuation of U.S. patent application Ser. No. 14/060,575, filed Oct. 22, 2013 and issued as U.S. Pat. No. 9,405,812 on Aug. 2, 2016, which claims the benefit of U.S. Provisional Patent Application No. 61/717,096, filed on Oct. 22, 2012, the disclosures of which are hereby incorporated by reference in their entirety.

FIELD OF THE INVENTION

The present invention relates to business intelligence systems, specifically the resource management of interest-driven business intelligence systems.

BACKGROUND

Business intelligence refers to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data, for example, business data. Data warehouses utilize databases to store, analyze, and harness the data in a productive and cost-effective manner. A variety of databases are commonly utilized, such as a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema which looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

SUMMARY OF THE INVENTION

Systems and methods for determining performance metadata describing performance metrics associated with obtaining data within an interest-driven business intelligence system in accordance with embodiments of the invention are illustrated. In accordance with some embodiments of this invention, an interest-driven business intelligence server system provides performance metadata for an interest-driven data pipeline in the following manner. The interest-driven business intelligence server system receives a report specification. The report specification includes at least one reporting data requirement. The interest-driven business intelligence server system determines performance metadata information for an interest-driven data pipeline that is utilized to generate reporting data based on the report specification. The performance metadata information for the interest-driven data pipeline is provided by the interest-driven business intelligence server system to an interest-driven user visualization system.

In accordance with some embodiments of the invention, the performance metadata information for interest-driven data pipeline provided to the interest-driven user visualization system includes performance metadata for at least one of the raw data, the reporting data, and the source data of the interest-driven data pipeline.

In accordance with some embodiments of the invention, the performance metadata information for the interest-driven data pipeline provided to the interest-driven user visualization system includes historical performance metadata for the interest-driven data pipeline. In accordance with some of these embodiments, the interest-driven business intelligence server system retrieves the historical performance metadata from one of metadata accessible by the interest-driven business intelligence server system and a memory storing the historical performance metadata for the interest-driven data pipeline.

In accordance with some of embodiments, the performance metadata information provided to the interest-driven visualization system includes estimates of performance metadata for the interest-driven data pipeline. In accordance with some of these embodiments, the interest-driven business intelligence application configures the processor to determine estimates of performance metadata for at least one of the raw data, the reporting data, and the source data in the interest-driven data pipeline that is utilized to generate reporting data based on the report specification.

In accordance with some embodiments, the interest-driven business intelligence server system obtains a sample of the raw data needed to satisfy the reporting requirements. Performance metadata of the sample raw data is determined by the interest-driven business intelligence server system. Estimates of performance metadata for the raw data needed to satisfy the reporting requirements are determined by the interest-driven business intelligence server system based on the determined performance metadata of the sample of raw data.

In accordance with some embodiments, the interest-driven business intelligence server system obtains the sample of raw data in the following manner. The interest-driven business intelligence server system generates a mini job that is an ETL processing job that extracts a sufficient amount to data provide an accurate sample of the raw data available and provides the mini job to a distributed storage system. The interest-driven business intelligence server system receives the sample of raw data from the distributed storage system in response to the mini job. In accordance with some of these embodiments, the performance metadata for the sample of raw data includes performance metadata for the mini job and the estimates of the performance metadata includes estimates for an ETL processing job for obtaining raw data to satisfy the reporting requirements.

In accordance with some embodiments, the interest-driven business intelligence server system determines estimates of performance metadata for the raw data satisfying the reporting data requirements by configuring the processor to retrieve historical performance metadata for the raw data satisfying the reporting data requirements. Furthermore, the historical information is used to determine the estimate of the performance metadata for the raw data satisfying the reporting data requirements.

In accordance with some embodiments, the interest-driven business intelligence server system determines estimates of performance metadata for the sample of source data satisfying the reporting requirements in the following manner. The interest-driven business intelligence server system obtains the sample of raw data satisfying the reporting data requirements. A sample of source data satisfying the reporting data requirements is generated by the interest-driven business intelligence server system from the sample of raw data. The interest-driven business intelligence server system determines performance metadata for the sample of source data. Estimates of performance metadata for the sample of source data satisfying the reporting requirements are determined by the interest-driven business intelligence server system based on the determined performance metadata of the sample of source data.

In accordance with some embodiments, the interest-driven business intelligence server system obtains the sample of source data in the following manner. The interest-driven business intelligence server system applies required filters and required aggregations to the sample of raw data. In some of these embodiments, the performance metadata includes performance metadata for the required aggregations and required filters. In accordance with further of these embodiments, the performance metadata for the source data includes performance metadata for the required filters and the required aggregations.

In accordance with some embodiments, the interest-driven business intelligence server system determines estimates of performance metadata for the source data satisfying the reporting data requirements by retrieving historical performance metadata for source data satisfying the reporting data requirements. The historical information is used to determine the estimate of the performance metadata for the source data satisfying the reporting data requirements.

In accordance with some embodiments, the estimates of the performance metadata for the source data are determined by the interest-driven business intelligence server system in the following manner. The interest-driven business intelligence server system obtains the sample of source data satisfying the reporting data requirements. A sample of reporting data satisfying the reporting data requirements is built the interest-driven business intelligence server system from the sample of source data. The interest-driven business intelligence server system determines performance metadata for the sample of reporting data. The estimates of performance metadata for the sample of reporting data satisfying the reporting requirements are determined by the interest-driven business intelligence server system based on the determined performance metadata of the sample of source data.

In accordance with some embodiments, the interest-driven business intelligence server system determines estimates of performance metadata for the reporting data satisfying the reporting data requirements by retrieving historical performance metadata for the reporting data satisfying the reporting data requirements. The historical performance metadata is used to determine the estimate of the performance metadata for the reporting data satisfying the reporting data requirements.

In accordance with some embodiments, the interest-driven data pipeline includes transformation processes that transform a set of raw data into a set of reporting data and intermediate sets of data generated by the transformation processes.

BRIEF DESCRIPTION OF THE DRAWINGS

FIG. 7 is a depiction of a screen of information about the data pipeline performance metadata provided to a user by an interest-driven business intelligence server system in accordance with embodiments of this invention.

DETAILED DISCLOSURE OF THE INVENTION

Figure 1:
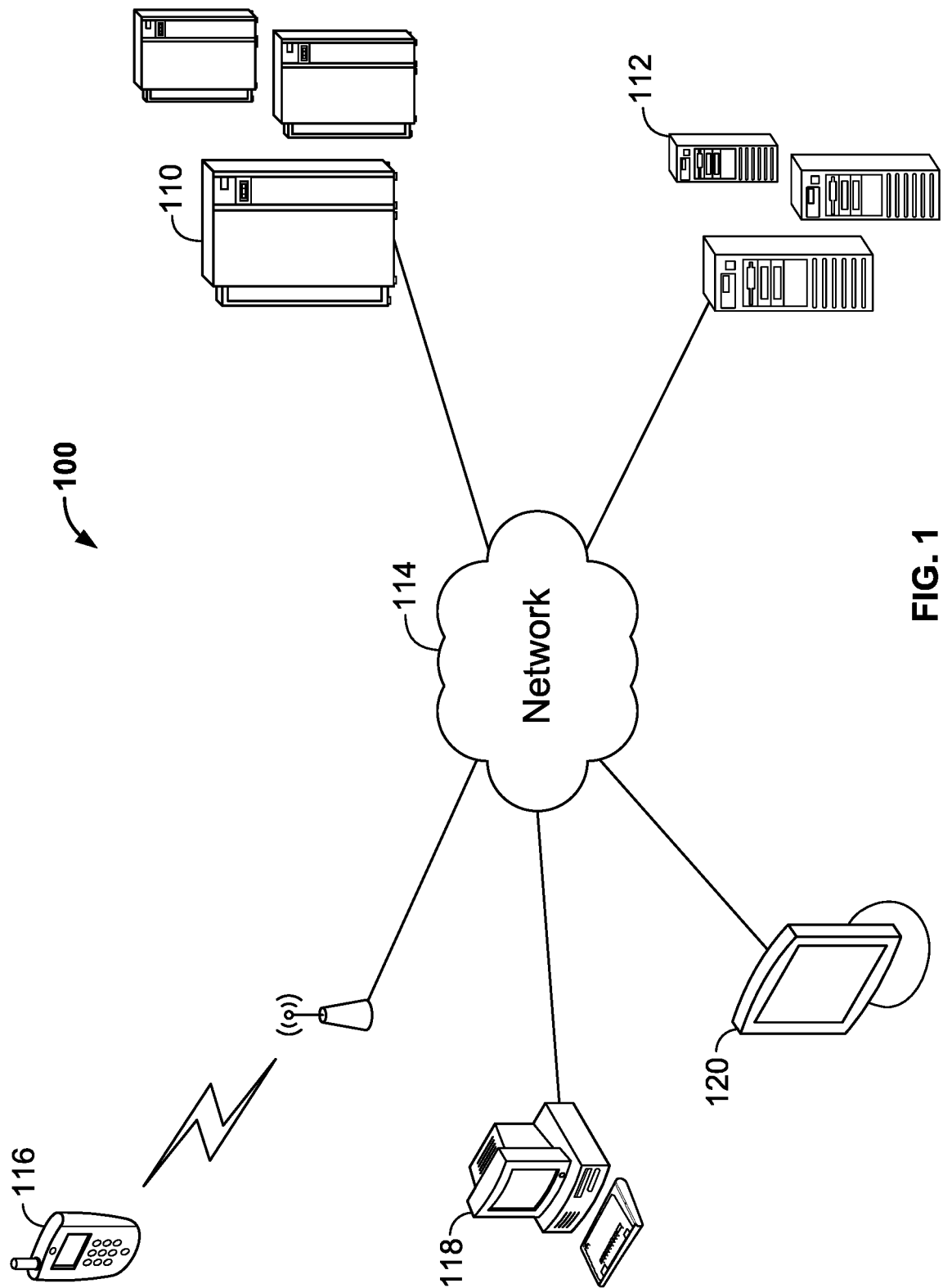
FIG. 1 is a network diagram of a business intelligence system including an interest-driven business intelligence server system in accordance with embodiments of the invention.

Turning now to the drawings, interest-driven business intelligence systems that provide performance metadata about an interest-driven data pipeline in accordance with embodiments of the invention are illustrated. Interest-driven data visualization systems enable analysts using a variety of systems, including, but not limited to, interest-driven business intelligence systems, to rapidly generate reports using data retrieved and held in-memory by interest-driven business intelligence systems and, at the same time, have the ability to drill down into the underlying raw data to dynamically create new reports. Interest-driven business intelligence systems are business intelligence systems configured to dynamically build an interest-driven data pipeline to provide an analyst with information of interest. Interest-driven business intelligence systems are capable of managing huge datasets in a way that provides an analyst with complete visibility into the available data and the ability to dynamically reconfigure the interest-driven business intelligence system to provide access to desired information. In order to achieve highly interactive performance, an interest-driven business intelligence system dynamically builds an interest-driven data pipeline to load data of interest into system memory based on the desired consumption of the data. Changes specified at the report level can be automatically compiled and traced backward by the interest-driven business intelligence system to create an appropriate interest-driven data pipeline to meet the new report requirements. Interest-driven business intelligence systems further build metadata concerning the data available in the interest-driven business intelligence system and provide the metadata to interest-driven data visualization systems to enable the construction of reports using the metadata. Available data in an interest-driven business intelligence system includes, but is not limited to, raw data, aggregate data, filtered data, and reporting data. The available data in an interest-driven business intelligence system can depend on the amount of processing time required to create the data; as such, the available data can be associated with data access time metadata indicating an estimation of the time required to produce the available data. Systems and methods for interest-driven business intelligence systems are disclosed in U.S. Pat. No. 8,447,721 issued to Eshleman et al., titled "Interest-Driven Business Intelligence Systems and Methods of Data Analysis Using Interest-Driven Data Pipelines" and filed Feb. 29, 2012, the entirety of which is incorporated by reference. Furthermore, a user may wish to know metrics about the interest-driven data pipeline in order to generate report requests that include as much desired data as possible given constraints based upon the size of the various sets of data and/or time needed to create the data. Thus, the visualization system may provide this information to a user to aid the user in creating a request for a report in some embodiments of this invention.

New reports and visualizations of those reports can utilize reporting data already provided by the interest-driven business intelligence system and/or cause new reporting data to be generated by the interest-driven business intelligence system to populate the report. Reporting data provided by interest-driven business intelligence systems includes raw data loaded from raw data storage in the business intelligence system that has been processed and loaded into a data structure to provide rapid access to the data. Raw data includes, but is not limited to, structured data, semi-structured data, and unstructured data and can be stored in one or more data sources associated with the interest-driven business intelligence system. In a variety of embodiments, structured and semi-structured data includes metadata, such as an index or other relationships, describing the data; unstructured data lacks any definitional structure. In several embodiments the processing of raw data includes, but is not limited to, aggregating the raw data and filtering the raw data. Business intelligence systems load raw data into a variety of data structures in accordance with a number of embodiments, including, but not limited to, online analytical processing (OLAP) cubes. In many embodiments, visualizations are the viewable representations of reporting data present in an interest-driven data visualization system.

Visualizations can take many forms, such as pie charts, bar charts, tables, or any other form, which enables the viewing of data contained in the report. In a variety of embodiments, visualizations are multi-dimensional and allow for multiple simultaneous displays, such as via layering and/or compositing different visualizations for different pieces of reporting data, using the reporting data associated with the visualization. The visualization itself is independent of the reporting data it operates on, allowing the analysis to be created on the fly for different pieces of reporting data. Rendering of visualizations is accomplished by associating the pieces of reporting data with graphical primitives and combining the graphical primitives to form a composite rendering of the visualization. The composite rendering takes into account the nature and attributes of the pieces of reporting data, enabling pieces of reporting data from disparate sources to be interpreted correctly by analyzing the visualization. The reports and/or the visualizations are configured to be displayed using display devices in several embodiments of the invention. In many embodiments of the invention, reports utilized in interest-driven data visualization systems include a set of datasets determined using reporting data received from an interest-driven business intelligence system and a set of visualizations. Interest-driven data visualization systems are configured to enable the dynamic association of datasets to visualizations to provide a variety of interactive reports describing the data. Different aspects of the visualization, including the color, style, size, and dimensions of the visualization may be mapped to facts contained in the datasets to generate reports. Additionally, the aspects of the visualization may be dynamically updated in real time. Interest-driven data visualization systems provide access to metadata describing the raw data available from an interest-driven business intelligence system and use that metadata to enable requests for new and updated reporting data for use in reports.

In cases where the interest-driven business intelligence system is unable to immediately provide the requested reporting data, such as in cases where the interest-driven business intelligence system retrieves and process raw data to generate the requested reporting data, interest-driven data visualization systems are configured to provide an indication of the time remaining until the requested reporting data is available. In several embodiments, interest-driven data visualization systems are configured to incrementally update reports based upon requested reporting data being provided by an interest-driven business intelligence system. The interest-driven business intelligence server system is configured to monitor the performance of the distributed computing platforms providing data to the interest-driven business intelligence server system. Based on the performance of the distributed computing platform(s) and the requested reporting data, an estimation of the amount of time, storage space, and/or processing power consumed in the generation of the reporting data can be generated. Processing power includes processor utilization, memory utilization, disk utilization, network utilization, job slot utilization, and any other computing power metric as appropriate to the requirements of specific applications in accordance with embodiments of the invention. This estimation can be passed to an interest-driven data visualization system in order to provide feedback regarding the expense of obtaining the requested reporting data. Based on this information, the reporting data requirements can be refined in order to more efficiently utilize the distributed computing platform. Similarly, the reporting data requirements can be refined in order to improve the amount of data being obtained. This is particularly useful in embodiments of the invention where there is a measured cost associated with the time and/or processing capabilities of the distributed computing platform and/or the interest-driven business intelligence server system.

System Overview

An interest-driven business intelligence system including an interest-driven business intelligence server system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven business intelligence server system 112 via a network 114. In several embodiments of the invention, the network 114 is a local area network. In many embodiments, the distributed computing platform 110 communicates with the interest-driven business intelligence server system 112 via the Internet 114. In a variety of embodiments, the distributed computing platform 110 is a cluster of computing devices configured as a distributed computing platform. The distributed computing platform 110 can be configured to act as a raw data storage system and a data warehouse within the interest-driven business intelligence system. In a number of embodiments, the distributed computing platform 110 includes a distributed file system configured to distribute the data stored within the distributed computing platform 110 across the cluster computing devices. In many embodiments, the distributed data is replicated across the computing devices within the distributed computing platform 110, thereby providing redundant storage of the data. The distributed computing platform 110 is configured to retrieve data from the computing devices by identifying one or more of the computing devices containing the requested data and retrieving some or all of the data from the computing devices. In a variety of embodiments where portions of a request for data are stored using different computing devices, the distributed computing platform 110 is configured to process the portions of data received from the computing devices in order to build the data obtained in response to the request for data. Any distributed file system, such as the Hadoop Distributed File System (HDFS) can be utilized as appropriate to the requirements of specific applications in accordance with embodiments of the invention. The distributed computing platform 110 can be configured to act as a raw data storage system and a data warehouse within the interest-driven business intelligence system. In several embodiments, the interest-driven business intelligence server system 112 is also implemented using one or a cluster of computing devices. In a variety of embodiments, alternative distributed processing systems are utilized.

Interest-driven data visualization systems enable users to specify reports including data visualizations that enable the user to explore the raw data stored within the distributed computing platform 110 using reporting data generated by the interest-driven business intelligence server system 112. Reporting data is provided in a variety of forms, including, but not limited to, snowflake schemas and star schemas. In many embodiments, reporting data is any data that includes fields of data populated using raw data stored within the distributed computing platform 110. The interest-driven business intelligence server system 112 is configured to communicate via the network 114 with one or more interest-driven data visualization systems, including, but not limited to, cellular telephones 116, personal computers 118, and presentation devices 120. In many embodiments of the invention, interest-driven data visualization systems include any computing device capable of receiving and/or displaying data.

Based upon received reporting data requirements, the interest-driven business intelligence server system 112 automatically compiles one or more interest-driven data pipelines to create or update reporting data to satisfy the received reporting data requirements. The interest-driven business intelligence server system is configured to compile one or more interest-driven data pipelines configured to create and push down jobs to the distributed computing platform 110 to create source data. The interest-driven business intelligence server system 112 is configured to apply various filters and/or aggregation processes to the source data to produce reporting data that can be transmitted to interest-driven data visualization systems. In many embodiments, the interest-driven business intelligence server system 112 includes reporting data that partially or fully satisfies the reporting data requirements. The interest-driven business intelligence server system 112 is configured to identify the relevant existing reporting data and/or previously received source data and configure an interest-driven data pipeline to create jobs requesting reporting data minimizing the redundancy between the existing data and the new reporting data requirements. In a variety of embodiments, the interest-driven business intelligence server system 112 is configured to determine redundancies between the requested data and existing data using metadata describing the data available from an interest-driven business intelligence system. The metadata describes what raw data is available from the interest-driven business intelligence system. In a number of embodiments, the metadata further describes what form the raw data is available in, such as, but not limited to, aggregate data, filtered data, source data, and reporting data. In several embodiments, the interest-driven business intelligence server system 112 receives a plurality of reporting data requirements and the interest-driven business intelligence server system 112 is configured to create jobs using the interest-driven data pipeline to create source data containing data fulfilling the union of the plurality of reporting data requirements. In a variety of embodiments, the interest-driven business intelligence server system 112 is configured to identify redundant data requirements in one or more reporting data requirements and configure an interest-driven data pipeline to create jobs requesting source data fulfilling the redundant data requirements. In several embodiments, the interest-driven business intelligence server system 112 is configured to store aggregate data and/or reporting data in a data mart and utilized the stored aggregate data and/or reporting data to identify the redundant data requirements. In a number of embodiments, the interest-driven business intelligence server system 112 is configured to identify when reporting data requirements request updated data for existing reporting data and/or source data and configure an interest-driven data pipeline to create jobs to retrieve an updated snapshot of the existing reporting data from the distributed computing platform 110. In a variety of embodiments, redundant information is identified using reporting data schemas defining the structure of reporting data and/or source data schemas defining the structure of source data. In many embodiments, redundant information is determined using one or more files stored using the interest-driven business intelligence server system; redundancies can be determined using the data contained in the files and/or metadata associated with the files, including the creation date of the files and/or the last modified date of the files.

In several embodiments, jobs pushed down to the distributed computing platform 110 by the interest-driven business intelligence server system 112 cannot be executed in a low-latency fashion. In many embodiments, the distributed computing platform 110 is configured to provide a partial set of source data fulfilling the pushed down job and the interest-driven business intelligence server system 112 is configured to create reporting data using the partial set of source data. As more source data is provided by the distributed computing platform 110, the interest-driven business intelligence server system 112 is configured to update the created reporting data based upon the received source data. In a number of embodiments, the interest-driven business intelligence server system will continue to update the reporting data until a termination condition is reached. These termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based upon the time previously measured in the retrieval of source data for similar reporting data requirements.

The interest-driven business intelligence server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metadata of the interest-driven data pipeline collected based upon the performance of previously executed jobs. For purposes of this discussion, performance metadata includes metrics that define the processes performed and/or data retrieved in the interest-driven data pipeline to provide the desired reporting data. The interest-driven data pipeline metrics include, but are not limited to, reporting data metrics, source data metrics, filter metrics, aggregation metrics, job metrics, and raw data metrics. Furthermore, metrics are any quantifiable property of a dataset or a process that can be provided to indicate the time and/or resources needed to provide the desired reporting data. Examples of metrics include, but are not limited to, the size of a particular data set, the time a process requires to provide the requested data, and the amount of resources needed to provide a particular set of data. In accordance with some of the embodiments, the performance metadata is used to select a previously executed job to retrieve the data. In accordance with other embodiments, the performance metadata is used to determine parameters and/or resource allocation for a job being created.

Raw data storage is utilized to store raw data, metadata storage is utilized to store data description metadata describing the raw data, and/or report storage is utilized to store previously generated reports including previous reporting data and previous reporting data requirements in a variety of embodiments of the invention. Raw data storage, metadata storage, and/or report storage can be a portion of the memory associated with the interest-driven business intelligence server system 112, the distributed computing platform 110, and/or a separate device in accordance with the specific requirements of specific embodiments of the invention.

Although a specific architecture for an interest-driven business intelligence system with an interest-driven business intelligence server system in accordance with an embodiment of the invention is conceptually illustrated in FIG. 1, any of a variety of architectures configured to store large data sets and to automatically build interest-driven data pipelines based upon reporting data requirements can also be utilized. Systems and methods for interest-driven business intelligence server systems in accordance with embodiments of the invention are discussed further below Interest-Driven Business Intelligence Server Systems Interest-driven business intelligence server systems in accordance with embodiments of the invention are configured to create jobs to request source data based upon received reporting data requirements and to create reporting data using the received source data. In many embodiments, the interest-driven business intelligence server systems are further configured to determine redundancies between previously received source data and generated reporting data. The interest-driven business intelligence server system configured to estimate the amount of time and/or processing power required to generate the reporting data in many embodiments. An interest-driven business intelligence server system in accordance with an embodiment of the invention is conceptually illustrated in FIG. 2. The interest-driven business intelligence server system 200 includes a processor 210 in communication with volatile memory 220 and non-volatile memory 230. The interest-driven business intelligence server system 200 also includes a network interface 240 configured to send and receive data over a network connection. In a number of embodiments, the network interface 240 is in communication with the processor 210, the non-volatile memory 230, and the volatile memory 220.

In several embodiments, non-volatile memory is any form of non-volatile storage configured to store a variety of data, including, but not limited to, reporting data 234 and source data 236. In the illustrated embodiment, the non-volatile memory 230 is also configured to store an interest-driven business intelligence application 232 that configures the processor 210 to perform interest-driven business intelligence processes. In many embodiments, interest-driven business intelligence processes include efficiently creating jobs using an interest-driven data pipeline to retrieve source data from an interest-driven business intelligence system based upon redundancies between reporting data requirements and existing reporting data schemas 234 and/or source data schemas 236. In a variety of embodiments, interest-driven business intelligence processes include iteratively updating reporting data based upon incrementally received source data. In several embodiments, interest-driven business intelligence processes include creating jobs using an interest-driven data pipeline to retrieve updates to existing reporting data 234 and/or source data 236 from an interest-driven business intelligence system based upon the content of the existing reporting data schemas 234, source data schemas 236, and/or metadata describing data available from an interest-driven business intelligence system. A number of interest-driven business intelligence processes not specifically described above may be utilized in accordance with the requirements of specific applications in accordance with embodiments of the invention. The non-volatile memory 230 further includes aggregate data storage 238 configured to store data received by the interest-driven business intelligence server system 200, including, but not limited to, aggregate data, source data, and reporting data. In a variety of embodiments, the aggregate data storage 238 is configured as a data mart.

The interest-driven business intelligence process includes analyzing the performance of the interest-driven business intelligence server system and/or at least one distributed computing platform. Based on the performance of the systems and the requested data, performance metadata information including time estimation data and size estimation data can be determined. Time estimation data reflects the amount of time and/or processing power that could be consumed in the creation of the requested data. Additionally, size estimation data reflects on the expected amount of data that would be retrieved to fulfill a reporting data request. This time performance metadata including estimation data and/or size estimation data can be transmitted to interest-driven data visualizations systems to provide an indication of the scale of a particular request. The performance metadata information including time estimation data and/or size estimation data can also be stored and utilized in the calculation of time and/or size estimations for other requests for reporting data.

In many embodiments, reporting data schemas 234, source data schemas 236, and/or the interest-driven business intelligence application 232 are stored using an external server system and received by the interest-driven business intelligence server system 200 using a network interface 240. External server systems in accordance with a variety of embodiments include, but are not limited to, interest-driven business intelligence systems, distributed computing platforms, and interest-driven business intelligence server systems. In several embodiments, the processor 210 is configured to transmit jobs using the network interface 240.

Figure 2:
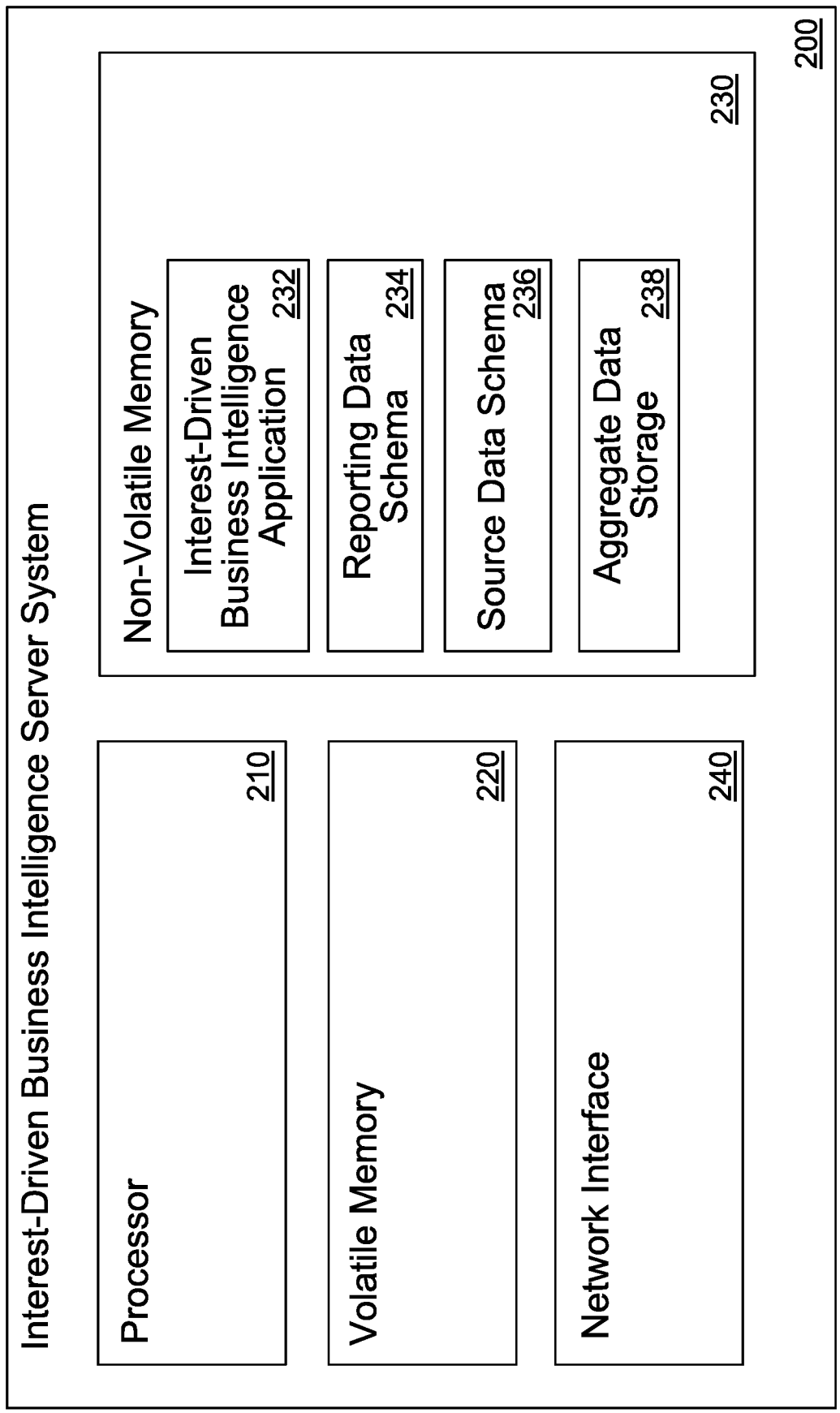
FIG. 2 is a conceptual illustration of an interest-driven business intelligence server system in accordance with embodiments of the invention.

Although a specific architecture for an interest-driven business intelligence server system in accordance with an embodiment of the invention is conceptually illustrated in FIG. 2, any of a variety of architectures, including those that store data or applications on disk or some other form of storage and are loaded into volatile memory 220 at runtime, can also be utilized. Methods for interest-driven business intelligence in accordance with embodiments of the invention are discussed further below.

Interest-Driven Business Intelligence with Redundancies

Figure 3:
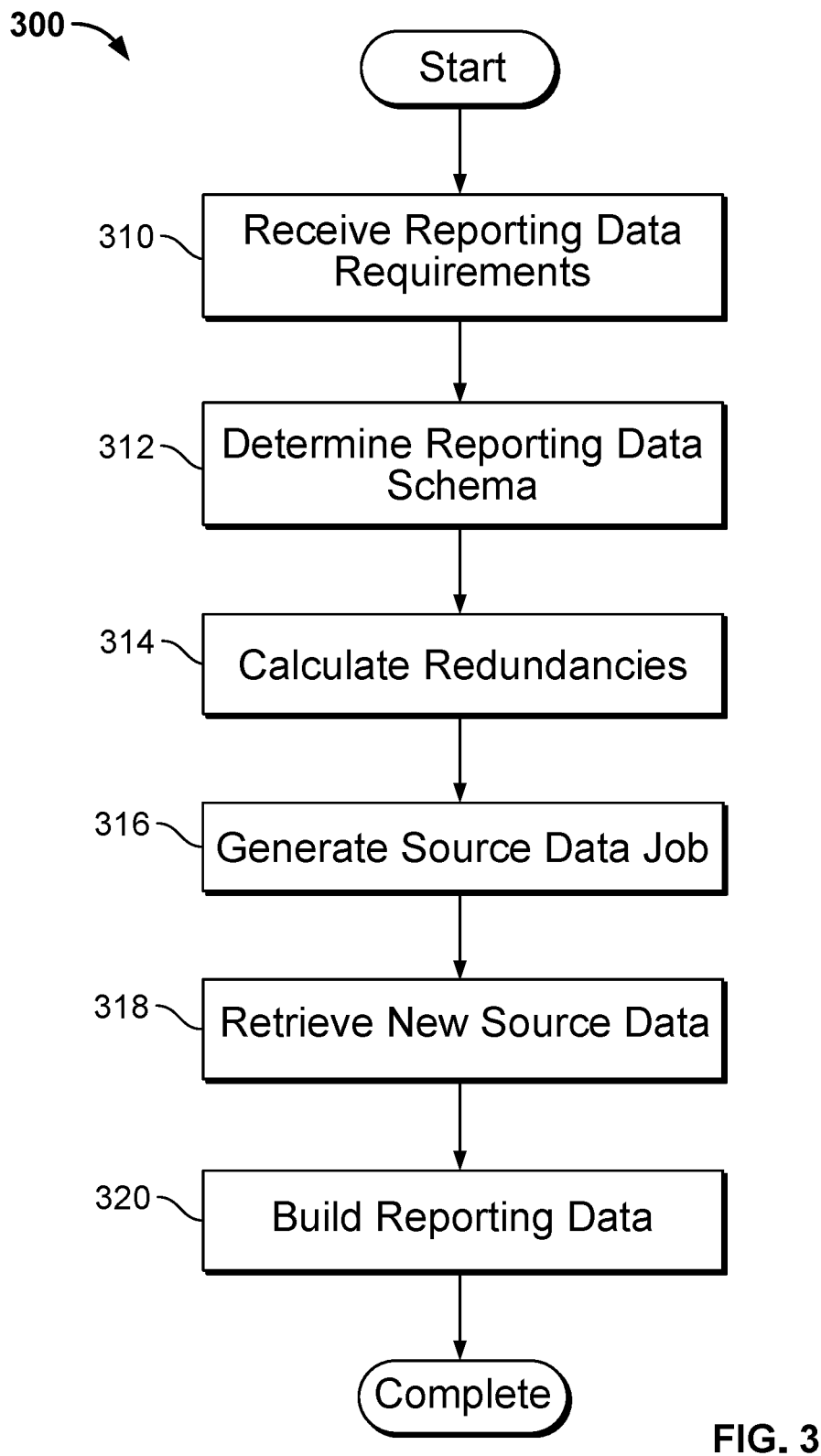
FIG. 3 is a flow chart illustrating a process for the interest-driven sharing of data in accordance with embodiments of the invention.

In a variety of embodiments, interest-driven business intelligence server systems are configured to determine redundancies between requested reporting data and data currently existing in the interest-driven business intelligence server system. The interest-driven business intelligence server systems then create jobs to request only new data needed to provide the requested reporting data. A process for interest-driven business intelligence with redundant data in accordance with an embodiment of the invention is illustrated in FIG. 3. The process 300 includes receiving (310) reporting data requirements. A reporting data schema is determined (312) based upon the received (310) reporting data requirements. Redundancies are calculated (314). A source data job is generated (316). New source data is retrieved (318). Reporting data is built (320).

In many embodiments, reporting data requirements are received (310) from an interest-driven data visualization system. In several embodiments, the received (310) reporting data requirements are based upon metadata describing raw data stored in an interest-driven business intelligence system. In a number of embodiments, the reporting data schema is determined (312) using the received (310) reporting data requirements. In a variety of embodiments, reporting data schemas may be defined (312) in a number of formats including, but not limited to, star schemas and snowflake schemas. In several embodiments, calculating (314) redundancies includes comparing the determined (312) reporting data schema against reporting data schemas and/or source data schemas present in an interest-driven business intelligence server system. In a number of embodiments, calculating (314) redundancies includes building a dictionary of dimensions contained in schemas defining existing reporting data and/or source data and comparing the dictionary of dimensions against the determined (312) reporting data schema. In many embodiments, a dimension directory includes a listing of dimensions in reporting data and/or source data stored in a data mart associated with an interest-driven business intelligence system and/or interest-driven business intelligence server system. In a variety of embodiments, the dimension directory includes dimension directory metadata describing the location of the dimensions within the file system of the interest-driven business intelligence system and/or the interest-driven business intelligence server system. In several embodiments, the dimension directory metadata includes ETL process definitions describing ETL processes that were utilized to generate the dimensions described in the dimension directory. In a variety of embodiments, the ETL process definitions include analyzing ETL processes for one or more pieces of reporting data and/or source data described in the dimension directory and creating one or more updated ETL processes incorporating the analyzing ETL processes. In several embodiments, redundancies are identified and/or optimizations are performed with respect to the analyzed ETL processes in the creation of the updated ETL process. In a variety of embodiments, the analyzed ETL processes are refreshed and/or updated based on the analysis. In a number of embodiments, comparing the dimension directory against the reporting data schema includes identifying corresponding dimensions in the directory of dimensions with dimensions in the reporting data schema. In many embodiments, calculating (314) redundancies includes comparing join indices in schemas defining existing reporting data and/or source data and the join indices of the determined (312) schema. In several embodiments, a join index is data describing a joined relation between two or more sets of data; the join index can also include aggregate data associated with the joined sets of data. In a variety of embodiments, calculating (314) redundancies includes comparing files stored on the interest-driven business intelligence server system associated with the existing reporting data and/or existing source data with the determined (312) schema. In several embodiments, the calculated (314) redundancies are stored using redundant data metadata describing data common to the identified raw data and the previous reporting data in the located previously generated reports In a number of embodiments, the source data job is generated (316) using an interest-driven data pipeline. In many embodiments, the generated (316) source data job is based upon metadata describing raw data available from an interest-driven business intelligence system. In a variety of embodiments, the generated (316) source data job retrieves data requested in the reporting data requirements that reduces the calculated (314) redundancy. In a variety of embodiments, the generated (316) source data job is configured to retrieve data from a plurality of data sources associated with an interest-driven business intelligence system. Systems and methods for retrieving data from multiple data sources that can be utilized in accordance with embodiments of the invention are disclosed in U.S. patent application Ser. No. 13/790,624, titled "Systems and Methods for Interest-Driven Distributed Data Server Systems" and filed Mar. 8, 2013, the entirety of which is hereby incorporated by reference. In several embodiments, the new source data is retrieved (318) from an interest-driven business intelligence system. In a variety of embodiments, the new source data is retrieved (318) from a plurality of data sources associated with an interest-driven business intelligence system. In many embodiments, the retrieved (318) source data includes a source data schema defining the dimensions and facts of the retrieved (318) source data. In a number of embodiments, the retrieved (318) source data includes metadata describing the data sources from which the source data was retrieved (318).

In a number of embodiments, building (320) reporting data includes combining the source data schema of the retrieved (318) source data with the reporting data schemas defining the existing reporting data and/or source data to create reporting data having a reporting data schema fulfilling the reporting data schema determined (312) using the received (310) reporting data requirements. Building (320) reporting data then includes retrieving the data corresponding to the new reporting data schema. In several embodiments, the calculation (314) of redundancies between the determined (312) schema and the retrieved (318) new source data is performed as the reporting data is built (320). In a variety of embodiments, the reporting data built (320) is a materialized data mart. Materialized data marts in accordance with several embodiments of the invention are relational databases containing data fulfilling the reporting data requirements; the materialized data marts can be queried like any other relational database and used to create additional reporting data. In many embodiments, building (320) reporting data includes combining files associated with the existing reporting data and/or existing source data with the retrieved (318) source data. In a variety of embodiments, data stored in materialized data marts is aggregated and/or filtered to create additional data stored in the materialized data mart. In several embodiments, data stored in multiple data marts can be combined in order to create new reporting data.

Although a specific process for interest-driven business intelligence with redundancies is described above with respect to FIG. 3, any of a variety of processes may be utilized in accordance with embodiments of the invention. Additional processes for interest-driven business intelligence in accordance with embodiments of the invention are discussed further below.

Snapshot Isolation

Figure 4:
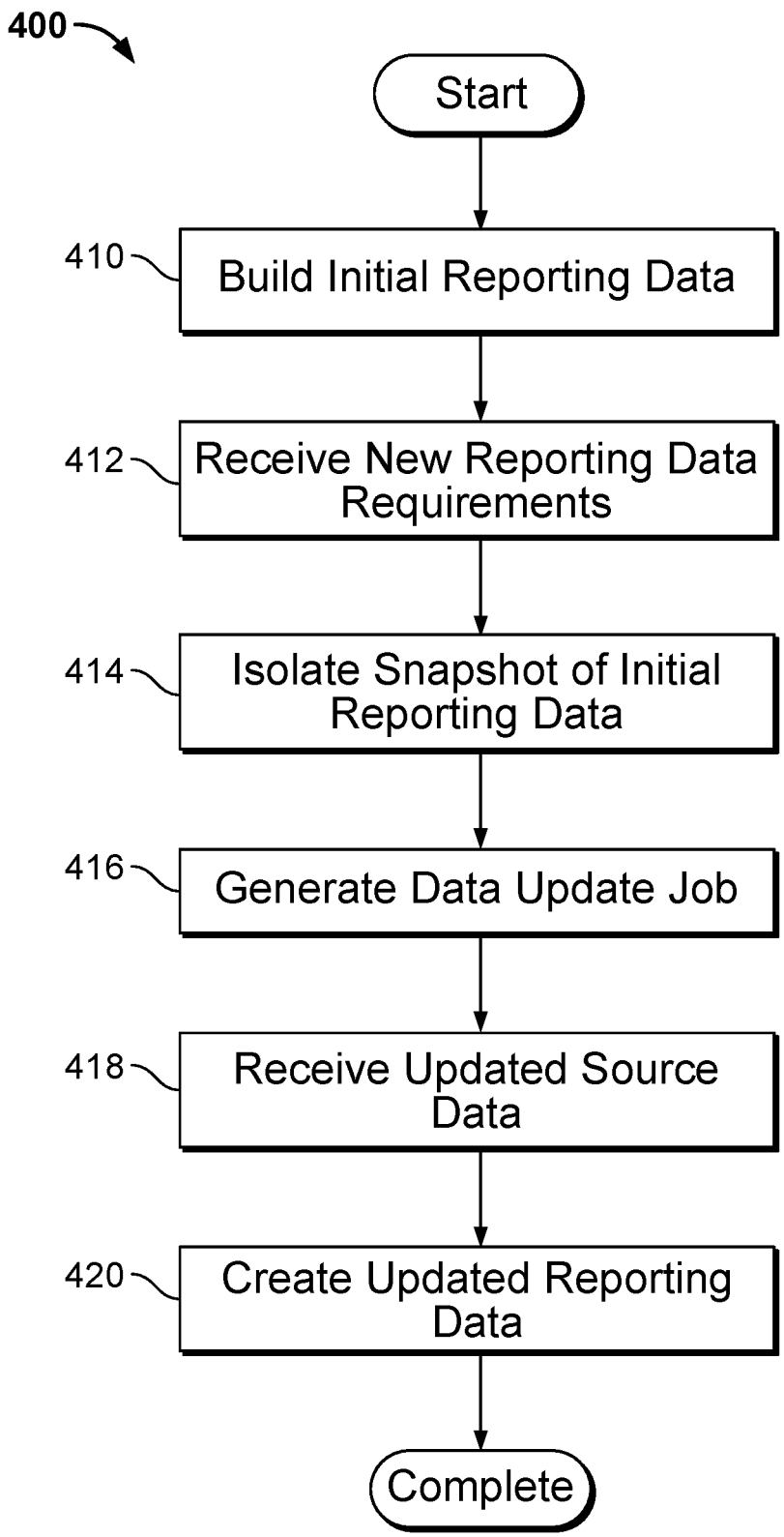
FIG. 4 is a flow chart illustrating a process for snapshot isolation in an interest-driven business intelligence server system in accordance with embodiments of the invention.

Typically, reporting data is generated by interest-driven business intelligence server systems with respect to raw data available at a particular point in time. In many cases, analysts later create reports reflecting an updated view of the previously generated reporting data without disrupting the previously created reporting data. Interest-driven business intelligence server systems can be configured to create a snapshot isolating the previously created reporting data to preserve reports relying upon the previously created reporting data and generate jobs requesting updated reporting data to fulfill the new report requirements. A process for snapshot isolation in interest-driven business intelligence server systems in accordance with an embodiment of the invention is illustrated in FIG. 4. The process 400 includes building (314) initial reporting data. New reporting data requirements are received (412). A snapshot of the initial reporting data is isolated (414). A data update job is generated (416). Updated source data is received (418). Updated reporting data is created (420).

In many embodiments, reporting data requirements are received (410) from an interest-driven data visualization system. In several embodiments, the received (410) reporting data requirements are based upon metadata describing raw data stored in an interest-driven business intelligence system. In several embodiments, isolating (414) a snapshot of the initial reporting data utilizes the received (412) new reporting data requirements. In a variety of embodiments, determining when a snapshot of the initial reporting data should be isolated (414) utilizes metadata describing updated raw data available from an interest-driven business intelligence system. In several embodiments, the snapshot is isolated (414) before the data update job is generated (416) and/or the updated source data is received (418). In many embodiments, the snapshot is isolated (414) after the data update job is generated (416) and/or the updated source data is received (418).

In a number of embodiments, the data update job is generated (416) using an interest-driven data pipeline. In many embodiments, the generated (416) data update job is based upon metadata describing raw data available from an interest-driven business intelligence system. In a variety of embodiments, the generated (416) data update job is configured to retrieve only the data that has been updated since the time that the initial reporting data was built (410); additional data can be retrieved along with the updated data as appropriate to the requirements of specific applications in accordance with embodiments of the invention. The time the initial reporting data was built (410) can be determined in a number of ways in accordance with embodiments of the invention, including, but not limited to, metadata associated with the initial reporting data, files storing the initial reporting data, the directory structure of the files storing the initial reporting data, and/or metadata associated with the files. Metadata associated with a file in accordance with many embodiments of the invention includes, but is not limited to, the creation date of the file, and the last modified date of the file. In a variety of embodiments, the generated (416) data update job is configured to retrieve data from a plurality of data sources associated with an interest-driven business intelligence system.

In several embodiments, the updated source data is received (418) from an interest-driven business intelligence system. In many embodiments, the received (418) updated source data includes a source data schema defining the dimensions and facts of the received (418) updated source data. In a number of embodiments, the received (418) updated source data includes metadata describing the data source providing the updated source data. In many embodiments, creating (420) the updated reporting data includes combining the source data schema for the updated source data with the reporting data schema for the initial reporting data. In a variety of embodiments, building (420) reporting data includes combining files associated with the existing reporting data and/or existing source data with the retrieved (418) source data. In several embodiments, creating (420) the updated reporting data includes logically eliminating redundant data between the initial reporting data and the updated source data.

Although a specific process for snapshot isolation in interest-driven business intelligence server systems is illustrated in FIG. 4, any of a variety of processes can be utilized in accordance with embodiments of the invention. Processes for iterative reporting data generation in accordance with embodiments of the invention are discussed further below.

Iterative Reporting Data Generation

Figure 5:
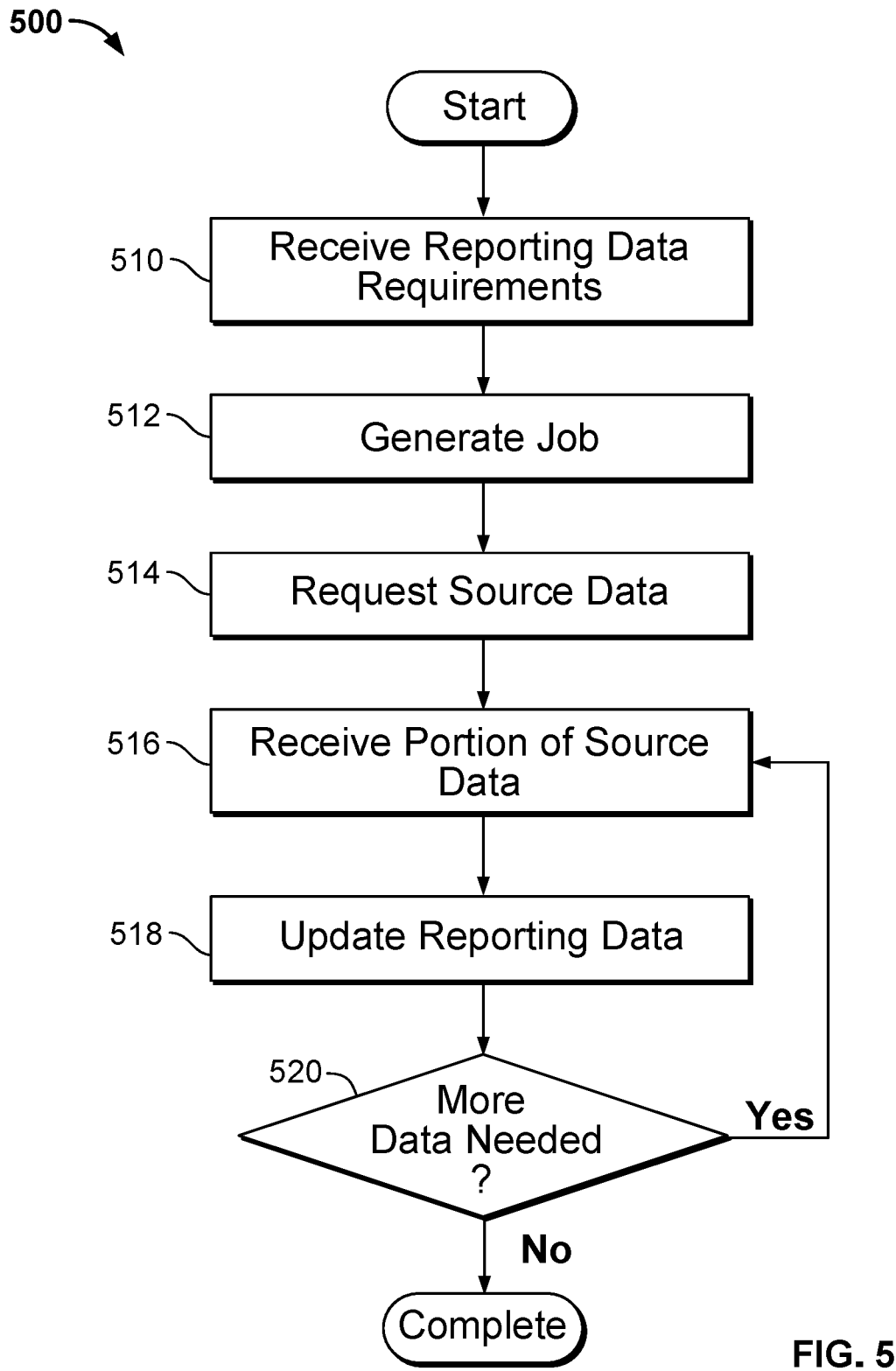
FIG. 5 is a flow chart illustrating a process for iterative reporting data generation in an interest-driven business intelligence server system in accordance with embodiments of the invention.

Interest-driven business intelligence server systems can be configured to create reporting data using source data received from an interest-driven business intelligence system. Interest-driven business intelligence server systems can create jobs to be pushed down to interest-driven business intelligence systems in order to create and retrieve source data that can be used to generate desired reports. However, the interest-driven business intelligence system providing the source data may not be able to execute the job in a low-latency fashion in all cases. In order to provide reporting data in a timely fashion, interest-driven business intelligence server systems are configured to incrementally retrieve source data and create reporting data in an iterative fashion utilizing the incrementally received source data. A process for iterative reporting data generation in accordance with an embodiment of the invention is illustrated in FIG. 5. The process 500 includes receiving (510) reporting data requirements. A job is generated (512). Source data is requested (514). A portion of the source data is received (516). Reporting data is updated (518). If additional source data is needed (520), another portion of the source data is received (516). If no more data is needed (520), the process completes.

In many embodiments, reporting data requirements are received (510) from an interest-driven data visualization system. In several embodiments, the received (510) reporting data requirements are based upon metadata describing raw data stored in an interest-driven business intelligence system. In a number of embodiments, the job is generated (512) using an interest-driven data pipeline. In many embodiments, the generated (512) job is based upon metadata describing raw data available from an interest-driven business intelligence system. In a variety of embodiments, the generated (512) job retrieves only the source data that has not been previously received (516). The source data that has been previously received (516) can be determined in a number of ways in accordance with embodiments of the invention, including, but not limited to, metadata associated with the source data, files storing the source data, the directory structure of the files storing the source data, and/or metadata associated with the files. Metadata associated with a file in accordance with many embodiments of the invention includes, but is not limited to, the creation date of the file and the last modified date of the file.

Typically, source data is requested (514) from an interest-driven business intelligence system. Source data may be requested (514) from a variety of other data sources in accordance with the requirements of a particular embodiment of the invention. A received (516) portion of source data can be any variety of portions of source data in accordance with many embodiments of the invention. Portions of source data may be determined according to a variety of criteria including, but not limited to, the time span of the portion of source data, the time required to receive (516) the portion of source data, the size of the portion of source data received (516), requests for additional portions of source data, and the availability of resources on the business intelligence system providing the source data. A number of processes may be utilized to update (518) the reporting data using the received (516) portion of source data. These processes include, but are not limited to, those described above with respect to FIG. 3 and FIG. 4. Many conditions may be utilized to determine if more data is needed (520) including, but not limited to, those described above with respect to receiving (516) portions of source data. In many embodiments, as portions of source data are received, the estimate of the time and/or space required to receive the remaining portions of source data is updated.

Although a specific process for iterative reporting data generation using interest-driven business intelligence server systems is described above with respect to FIG. 5, any of a variety of processes may be utilized in accordance with embodiments of the invention. Processes for sharing reporting data between interest-driven business intelligence systems using interest-driven business intelligence server systems in accordance with embodiments of the invention are discussed below.

Sharing Reporting Data

Figure 6:
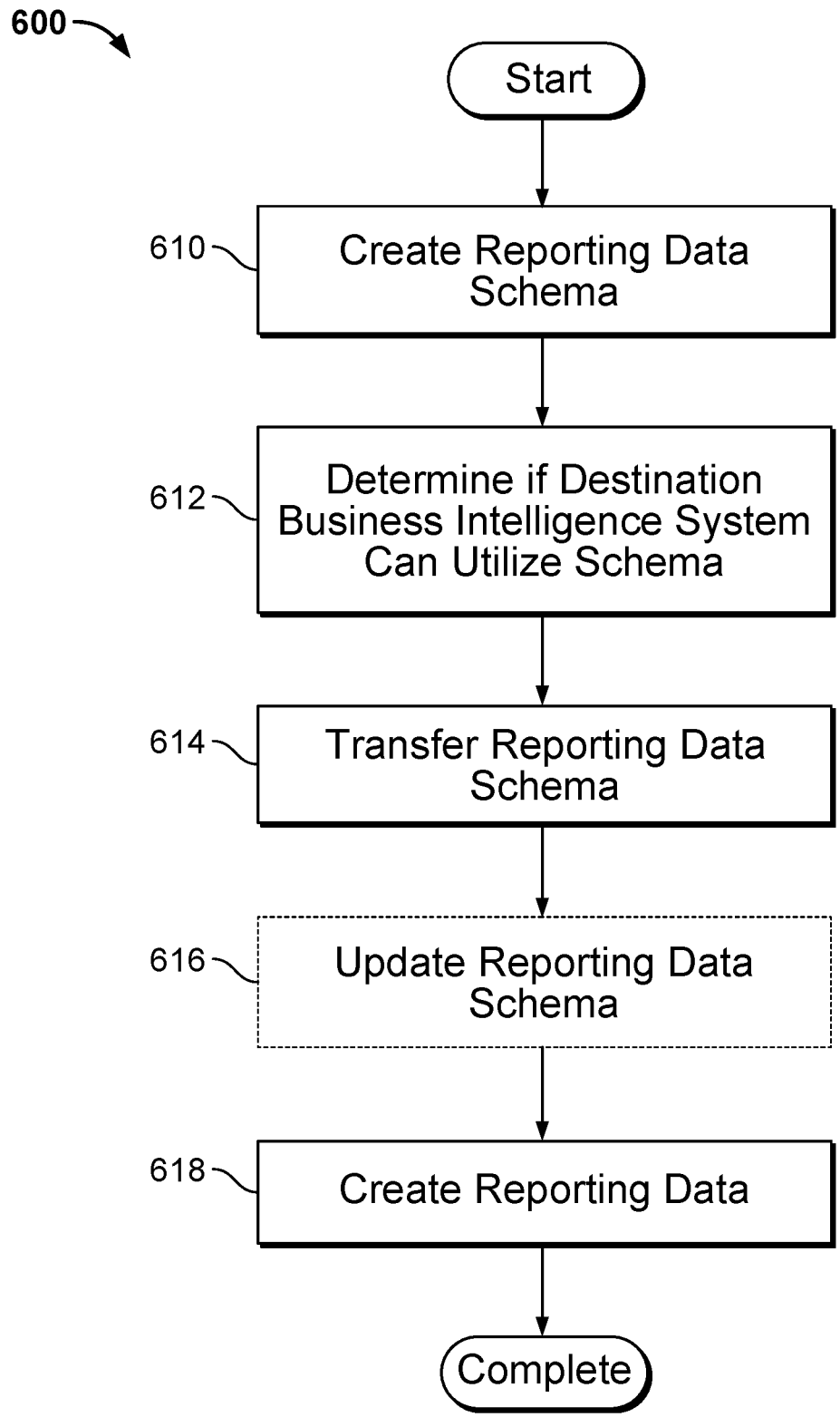
FIG. 6 is a flow chart illustrating a process for sharing reporting data between business intelligence systems using interest-driven sharing systems in accordance with embodiments of the invention.

In a variety of embodiments, interest-driven business intelligence server systems are configured to share reporting data and/or reporting data schemas between interest-driven business intelligence systems capable of generating similar source data and/or source data metadata. A process for sharing reporting data in accordance with an embodiment of the invention is illustrated in FIG. 6. The process 600 includes creating (610) a reporting data schema. A determination is made (612) if a second interest-driven business intelligence system can generate source data to materialize the reporting data schema. The reporting data schema is transferred (614) to the second interest-driven business intelligence system. In a variety of embodiments, the reporting data schema is updated (616). Reporting data is created (618).

In many embodiments, the created (610) reporting data schema is based upon reporting data requirements determined using metadata describing raw data available from a first interest-driven business intelligence system. In a variety of embodiments, the created (610) reporting data schema is a pre-built reporting data schema. In several embodiments, determining (612) if the destination interest-driven business intelligence system can utilize the created (610) reporting data schema involves comparing metadata describing raw data available on the first interest-driven business intelligence system with metadata describing raw data available on the destination interest-driven business intelligence system. In a number of embodiments, the reporting data schema will be shared if there is a certain amount of overlap between the raw data available; this threshold amount may be pre-determined and/or determined dynamically. In many embodiments, the reporting data schema is only transferred (614) if the determination (612) indicates that the reporting data schema can be materialized into reporting data using the destination interest-driven business intelligence system. In many embodiments, the reporting data schema (616) is updated based upon the availability of data from the destination interest-driven business intelligence system. In a variety of embodiments, the availability of data on the destination interest-driven business intelligence system is determined using metadata describing the raw data available along with any aggregate data and/or filtered data. The update (616) can be performed using a variety of systems in accordance with embodiments of the invention, including interest-driven business intelligence server systems and interest-driven data visualization systems. The update may be performed automatically by a machine or by input received from an analyst in accordance with the requirements of particular embodiments of the invention. In several embodiments, reporting data is created (618) using source data generated by the destination interest-driven business intelligence system in response to a job generated using an interest-driven business intelligence server system using the transferred (614) reporting data requirements. In many embodiments, the job is generated using the updated (616) reporting data. In a number of embodiments, the reporting data is created (618) using a variety of processes, including those described above depending on the requirements of particular embodiments of the invention.

A specific process for sharing reporting data generated using interest-driven business intelligence server systems between interest-driven business intelligence systems is described above with respect to FIG. 6; however, any of a variety of processes may be utilized in accordance with embodiments of the invention. Techniques for estimating the time and/or processing power for fulfilling requests for data in accordance with embodiments of the invention are described in detail below.

Providing Information Pertaining to Data Pipeline Metrics

In accordance with several embodiments of this invention, the interest-driven business intelligence system may provide a user with information about the performance metadata information of the interest-driven data pipeline in order to allow the user to generate reporting data requirements that are likely to generate a desired amount of reporting data in a desired amount of time. For purposes of this discussion, interest-driven pipeline performance metadata information includes historical and estimated interest-driven data pipeline performance metadata. The interest-driven data pipeline performance metadata includes metric information that describes the processes performed and/or data retrieved to provide the desired reporting data. The interest-driven data pipeline performance metadata includes, but are not limited to, reporting performance metadata, source data performance metadata, filter performance metadata, aggregation performance metadata, job performance metadata, and raw data performance metadata. Furthermore, performance metadata includes metrics that quantify any property of a dataset or a process that can be provided to a user to indicate the time and/or resources needed to provide the desired reporting data. Examples of metrics include, but are not limited to, the size of a particular data set, the time a process requires to provide the requested data, and the amount of resources needed to provide a particular set of data.

A display that provides performance metadata information of an interest-driven data pipeline in accordance with embodiments of this invention is shown in FIG. 7. Display 700 includes performance metadata information pertaining to various portions of the interest-driven data pipeline. In the shown embodiment, the term lens is used to indicate reporting data. However, one skilled in the art will recognize that a lens is one form of reporting data. One skilled in the art will recognize that reporting data can be characterized and/or organized in other manners without departing from this invention. The displayed information pertaining to source and/or reporting data metrics include a reporting data title field 705, a reporting data description field 707, an estimated reporting data size field 710, a historical reporting data size information field 715, a maximum reporting data set size 720, a number of measure fields 725, a number of dimensions of reporting data field 725, a number of filters applied to source data field 730, an input data size field 735, a filters applied field 740, a permission setting field 742. Other fields that provide other performance metadata information including information that relates to the time needed to the complete a process that generates the desired reporting and/or source data are not shown in the display 700. However, these and other performance metadata information not shown can be included in a display in other embodiments of this invention.

The estimated reporting data size field 710 indicates the estimated size of the reporting data that will be provided based upon received reporting data requirements. The historical reporting data size field indicates the size of reporting data the last time the reporting data was retrieved. The maximum reporting data set size is the maximum allowable size of a set of reporting data. The reporting data measures field 725 indicates the estimated number of measures present in the reporting data. The reporting data dimension field 725 provides the estimated number of dimensions present in the reporting data. Input data size field 735 indicates the estimated size of the source data. The filters applied field 740 indicates the filters applied to the source data applied to the source data to obtain the reporting data.

Information pertaining to the raw data in display 700 includes an all available fields field 745, fields applied field 750, data sets available field 755. The all available fields field 745 indicates an estimate of the number of all of the fields available in the raw data. The fields applied field 750 indicates the fields that are applied to the raw data to obtain the source data based on the reporting data requirements. The data sets available field 755 provides a listing of the types of data sets that can be generated from the raw data based upon the estimated available fields in the raw data.

Display 700 also includes estimated metrics of particular data sets extracted from the raw data. In display 700, these estimated metrics includes a title of the data set field 755, an estimated number of distinct values field 760, an estimated reporting data set size impact field 765, and a data distribution field 770. The title of the data set field indicates a title for the data set being estimated from the raw data. The estimated number of distinct value fields 760 indicates the number unique information sets within the estimated data set. The estimated data set size impact field 765 indicates the amount of data that the data set may add to the reporting data. The data distribution field 770 provides a visual indication of the impact of different data sets compared to the data set for which estimated metrics are provided.

Processes for Providing Performance Metadata Information

In accordance with embodiments of this invention, the interest-driven business intelligence server system provides performance metadata information to the interest-driven data visualization system to allow the interest-driven data visualization system to provide the performance metadata to the user in some manner, such as display 700. The processes in accordance with embodiments of this invention are shown in FIGS. 8-12.

Figure 8:
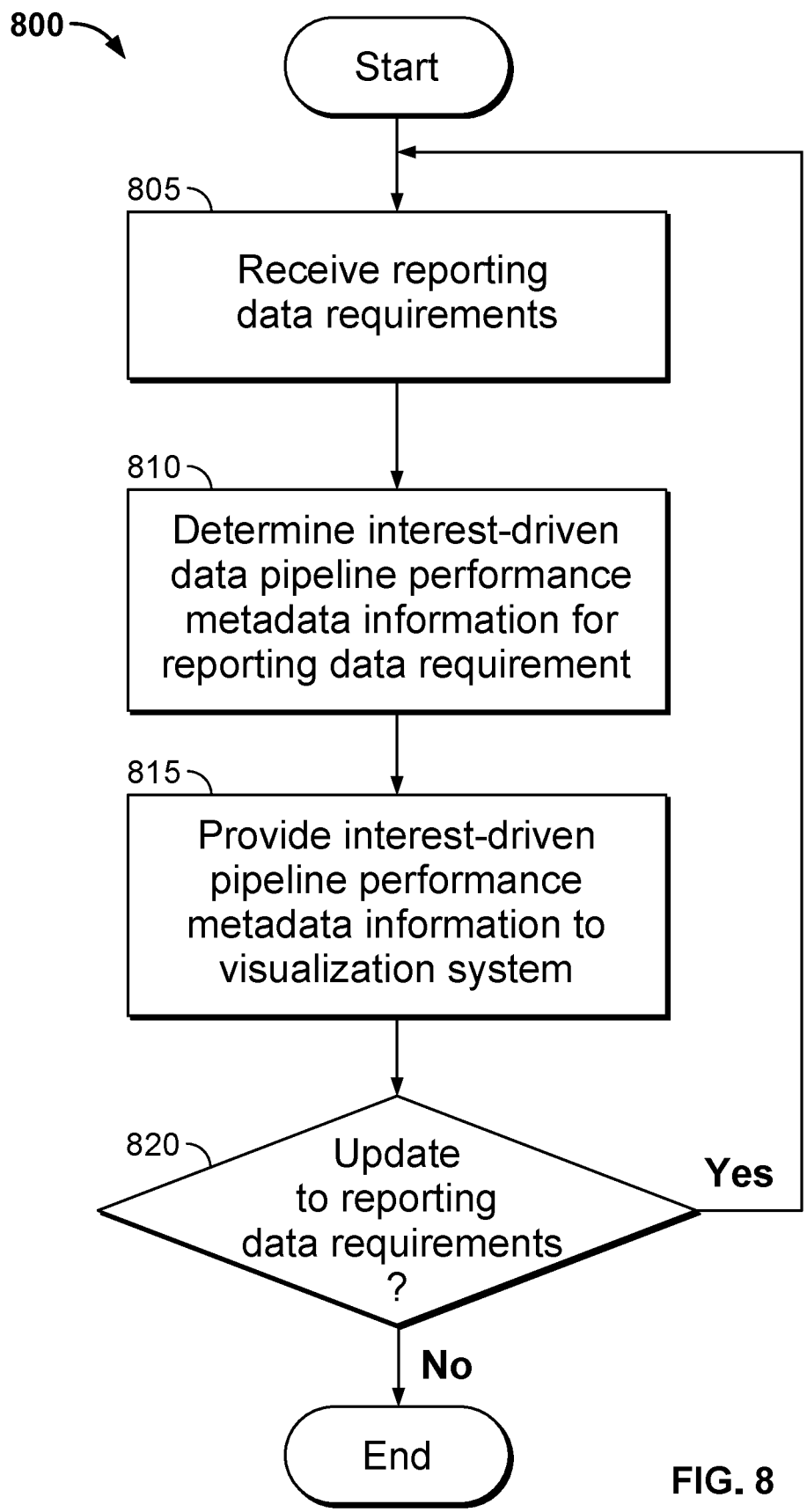
FIG. 8 is a flow diagram illustrating a process for providing performance metadata about an interest-driven data pipeline performed by an interest-driven business intelligence server system in accordance with embodiments of this invention.

The provided performance metadata information provided by the interest-driven business intelligence server system includes historical performance metadata and estimated performance metadata derived from sample data. A process performed by the interest-driven business intelligence server system to provide the performance metadata information pertaining to the interest-driven data pipeline to the interest-driven data visualization system in accordance with embodiments of this invention is shown in FIG. 8. Process 800 includes receiving reporting data requirements (805), determining interest-driven data pipeline performance metadata information to be provided (810), providing the performance metadata to the interest-driven data visualization system (815), determining if an update to the reporting requirements is received (820) and repeating process 800 in response to receiving an update of the reporting information.

The interest-driven business intelligence server receives reporting data requirements from an interest-driven data visualization system (805). Based upon the reporting data requirements received, the interest-driven business intelligence server determines the performance metadata for the interest driven data pipeline including, but not limited to, estimated and/or historical performance metadata for the reporting information; estimated and/or historical performance metadata for source data; and estimated and/or historical information for the raw data (810). Historical performance metadata may be retrieved from metadata accessible by the interest-driven business intelligence server systems in accordance with some embodiments. In accordance with other embodiments, historical performance metadata may be stored in a particular portion of memory accessible by the interest-driven business intelligence server. In still other embodiments, the historical performance metadata is determined based upon the source data and/or snap shot of the source data currently available to the interest-driven business intelligence server system. The interest-driven business intelligence server system also generates a sample set of the reporting source, and or raw data sets and measures the metrics of the sample sets of raw, source, and reporting data sets; and derives estimated metrics to include in the estimated performance metadata from the measured metrics of the sample sets of data.

The determined the performance metadata information including estimated and/or historical performance metadata is then provided by the interest-driven business intelligence server system to the interest-driven visualization system (815). Based on the provided performance metadata, the user may wish to modify the reporting data requirements. If so, the interest-driven business intelligence server system receives the updates and repeats the process 800 using the updated reporting data requirements. Otherwise, process 800 ends.

Although a specific process performed by the interest-driven business intelligence server system to provide the performance metadata information is illustrated in FIG. 8, any of a variety of processes can be utilized in accordance with embodiments of the invention.

Process for Generating Performance Metadata

Figure 9:
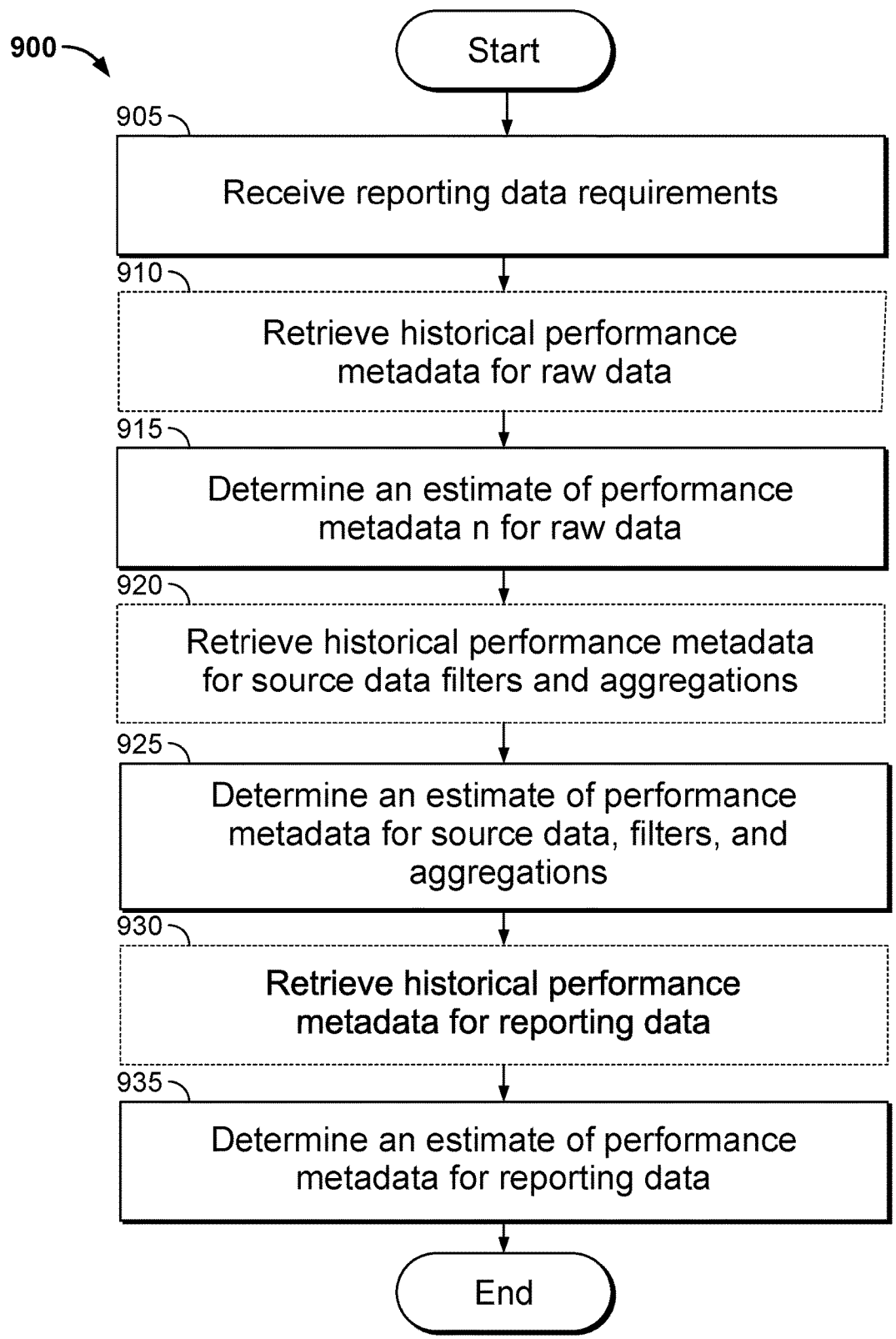
FIG. 9 is a flow diagram illustrating a process for determining performance metadata for the interest-driven data pipeline performed by the interest-driven business intelligence server system in accordance with embodiments of this invention.

A process for obtaining the performance metadata information including estimated and/or historical performance metadata for the interest-driven data pipeline to provide to the interest-driven visualization system in accordance with embodiments of this invention is shown in FIG. 9. Process 900 receives the reporting data requirements (905). Based upon the reporting data requirements, process 900 also performs a process for retrieving historical performance metadata for a set of raw data needed to generate the reporting data needed to satisfy the reporting requirements (910), determining estimates of performance metadata for a set of the raw data needed to satisfy the reporting requirements (915), retrieving historical performance metadata for a set of source data needed to generate the reporting data (920), determining estimates of the performance metadata for a set of source data likely to satisfy the reporting requirements (925), retrieving the historical performance metadata for reporting data needed to generate the reporting data needed to satisfy the reporting requirements (930), and determining an estimate of performance metadata of the reporting data likely to satisfy the reporting requirements (935).

The reporting data requirements are by the interest-driven business intelligence server system receives from the interest-driven data visualization system (905). Based upon the reporting data requirements, the process 900 may optionally determine whether there is historical performance metadata available for the interest-driven data pipeline needed to provide the reporting data. Historical information may be available from stored metadata, may be stored in a memory accessible by the interest-driven business intelligence server system; or may be generated from a snap shot of the source data and/or raw data available to the interest-driven business intelligence server system. If historical performance metadata for the raw data needed to satisfy the reporting requirements is available, the option step of retrieving the historical performance metadata for the raw data (910) performed and the historical performance metadata for the raw data is added to the performance metadata information to provide to the interest-driven data visualization system. Estimated performance metadata for the raw data needed to obtain the report data is determined based on the reporting data requirements and/or the historical performance metadata (915) and the estimated performance metadata is added to the performance metadata information to be provided. In accordance with some embodiments of this invention, historical or stored raw data is used to estimate the performance metadata. In accordance with other embodiments, a sample of the raw generates is extracted and used to generate the estimated performance metadata for the raw data. A process for determining estimates of the performance metadata for the raw data using sample data in accordance with embodiments of this invention is described below with respect to FIG. 10.

In embodiments that have historical performance metadata available, the optional step of retrieving the historical performance metadata for the source data (920) is performed and the retrieved historical performance metadata is added to the performance metadata information to be provided. Estimated performance metadata for the source data is determined based upon the historical performance metadata and a sample of source data (925). The sample of source data may be stored source data available to the interest-driven business intelligence server system and/o a sample of source data derived from the extracted the sample of raw data. A process for determining estimated performance metadata for the source data in accordance with embodiments of this invention is described below with respect to FIG. 11.

An optional step of retrieving historical performance metadata for the reporting data (925) is performed if historical performance metadata for the reporting data is available to the interest-driven business intelligence server system. Estimated performance metadata is then determined by the interest-driven business intelligence server system based upon the historical performance metadata for the reporting data and a sample of reporting data needed to satisfy the reporting requirements (930). The sample of reporting data may be historical reporting data and/or a sample of reporting data generated from the sample of source data. A process for determining the estimated performance metadata for the reporting data using a sample of reporting data derived from a sample of source data in accordance with embodiments of this invention is described below with respect to FIG. 12.

Although a specific process performed by the interest-driven business intelligence server system to obtain the performance metadata information to provide to the visualization system is illustrated in FIG. 9, any of a variety of processes can be utilized in accordance with embodiments of the invention.

Figure 10:
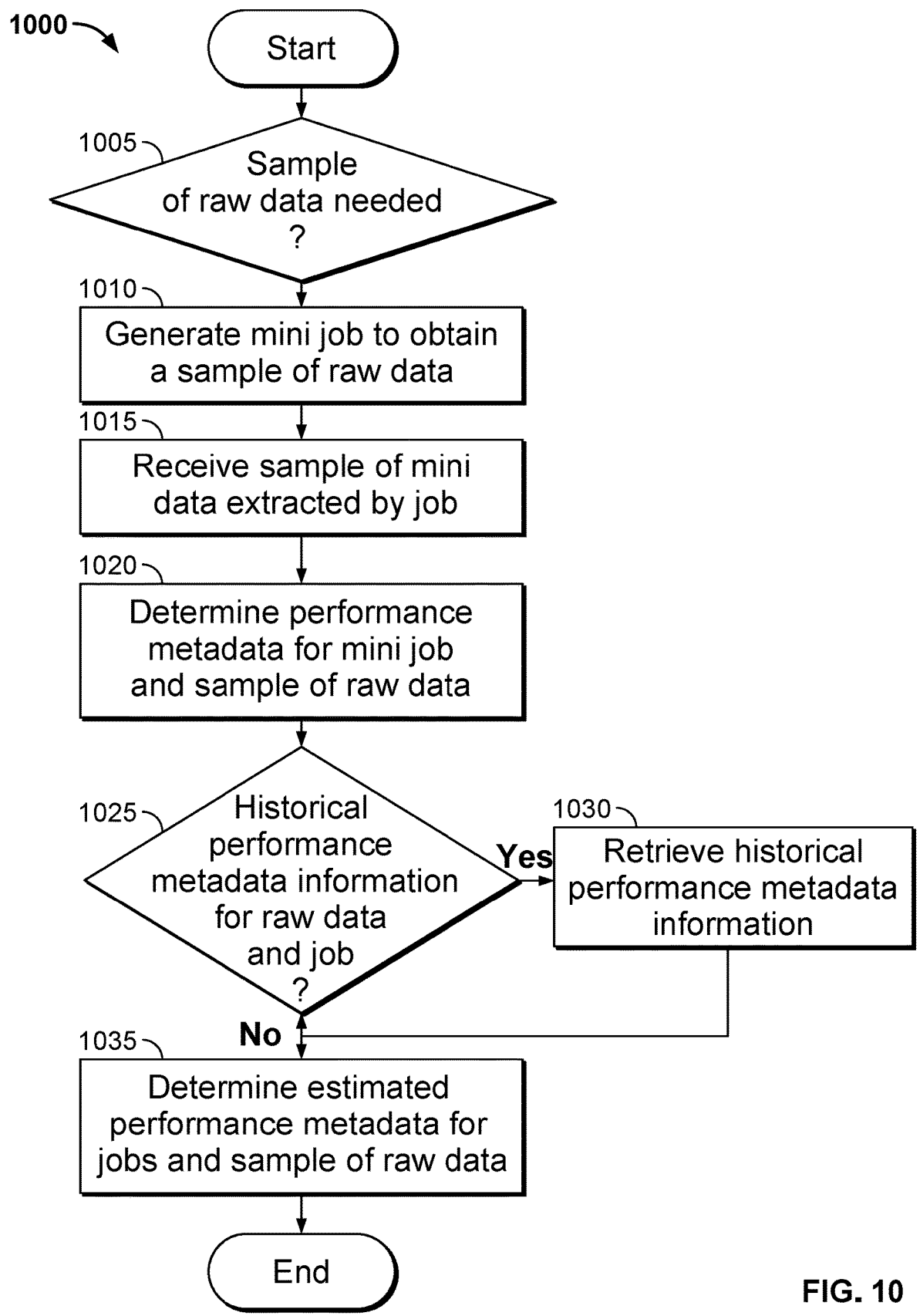
FIG. 10 is a flow diagram illustrating a process for determining performance metadata pertaining to raw data in the interest-driven data pipeline performed by an interest-driven business intelligence server system in accordance with embodiments of this invention.

A process for determining an estimate the performance metadata for raw data in an interest-driven data pipeline for satisfying reporting data requirements in accordance with embodiments of this invention is shown in FIG. 10. Process 1000 includes determining whether a sample of raw data is needed to estimate the raw data performance metadata (1005); generating a mini-job to obtain the sample of raw data and providing the mini-job to a distributed storage system (1010); receiving a sample of the raw data (1015); determining metrics for the mini job (1020); retrieving historical metrics for jobs obtaining the raw data (1030); and generating estimated performance metadata (1030).

Process 1000 determines whether a sample of the raw data is needed (1005). The determination may be made by determining if the reporting data relies only on data already accessible by the interest-driven business intelligence server system. If an update of the raw data is not needed, process 1000 proceeds to generating the estimated performance metadata (1030). If an update of the raw data is needed and/or a new set of raw data is needed to provide the reporting data, process 1000 generates a mini job to obtain a sample of the raw data (1010). The sample should be sufficiently large so that the statistics of the sample are likely to reflect the statistics of a complete set of raw data. For example, the mini job should access and/or include at least one million fields of data (or some other significant amount of data) to provide a sufficient sample of the raw data. The interest-driven business intelligence server system receives the raw data collected based upon the mini job from the distributed storage system (1015).

The performance metadata for the mini job and the sample of raw data are then determined (1020). The performance metadata may include, but is not limited to, the size of the set of sample raw data, the time taken to complete the mini job, the resources needed to perform the mini job, and resources needed by the interest-driven business intelligence server system to store the sample of raw data. The determined performance metadata may be reported by the distributed data storage system and/or monitored by the interest-driven business intelligence server system while receiving the sample data and/or while the mini job is performed. The process may also determine if performance metadata for a previous performance of the job or a similar job is available (1025). If the historical performance metadata is available, the interest-driven business intelligence server system retrieves the historical performance metadata (1030). The interest-driven business intelligence server system then generates an estimate of the performance metadata for the raw data from the sample of the raw data received (1035) and adds the determined estimated performance metadata to the metadata information to visualization system. In accordance with some embodiments, the estimate is determined from the received sample of the raw data and historical performance metadata. The estimates of the performance metadata may be projections of the likely performance metadata based upon an extrapolation of the performance metadata of the sample of the raw data. The extrapolation may be modified by the historical performance metadata in accordance with some embodiments. In accordance with some embodiments, a certain amount may be added to the extrapolations to provide an upper limit estimate for a particular metric in the performance metadata.

Although a specific process performed by the interest-driven business intelligence server system to determine of the estimated performance metadata for the raw data is illustrated in FIG. 10, any of a variety of processes can be utilized in accordance with embodiments of the invention.

Figure 11:
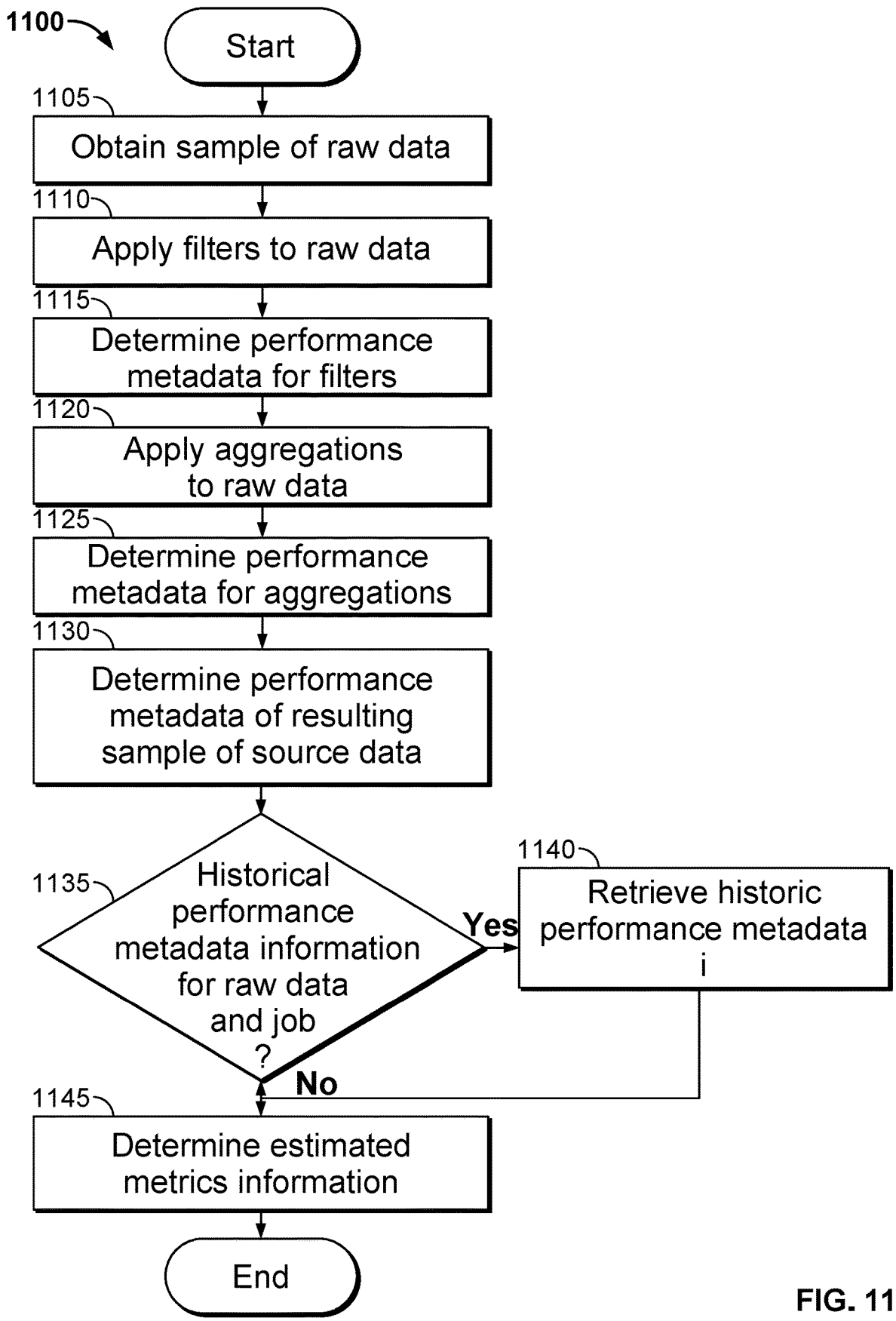
FIG. 11 is a flow diagram illustrating a process for determining performance metadata pertaining to source data in the interest-driven data performed by an interest-driven business intelligence server system in accordance with embodiments of this invention.

The sample of raw data may then be used to generate a sample of the source data and to generate estimates of the performance metadata for the source data needed to provide reporting data based the received data requirements. A process for generating the sample source data and estimated performance metadata for the source data needed to satisfy the received reporting requirements in accordance with embodiments of this invention is illustrated in FIG. 11. In process 1100, the interest-driven business intelligence server system obtains the sample of raw data (1105); applies a set of filters to the sample raw data based upon the reporting requirements (1110); determines the performance metadata for the application of the filters (1115); applies any aggregations to the raw data (1120); determines performance metadata of the aggregations (1125); determines the performance metadata of the resulting sample of source data (1130); retrieves historical data if available (1140); and generates estimated performance metadata for the filters, aggregations and sample of source data (1145).

The sample of raw data is read from memory after the sample is generated (if needed) (1105). Any filters that are to be applied to the raw data based upon the reporting data requirements are applied to the sample raw data (1110). Performance metadata for the filters are measured and/or determined from the application of the filters to the sample raw data (1115). Aggregations are also applied to the sample raw data to generate sample source data (1120). The performance metadata for the aggregations are measured and/or determined from the application of the aggregations to the sample raw data (1125). The performance metadata of the sample source data generated from the application of the filters and aggregations to the sample raw data are then determined (1130). The determination of the performance metadata for the filters, aggregations, and sample source data are performed as if actual source data is formed. Therefore, a complete discussion of how the metrics are determined is omitted for brevity.

Process 1100 determines whether any historical performance metadata is available for the filters, aggregations and source data (1130). If so, the historical performance metadata is retrieved (1135). The historical performance metadata may be stored in metadata accessible by the interest-driven business intelligence server system; may be stored in a separate memory accessible by the interest-driven business intelligence system; or may be generated from a stored snap shot of previous source data or previously stored source data. Other methods of obtaining the historical performance metadata may be used without departing from this invention. Estimated performance metadata is then generated from the determined performance metadata of the sample source data, filters, and aggregations (1145). The estimated performance metadata may be generated based upon the historical performance metadata if available in some embodiments. The estimated performance metadata may be determined by extrapolation of the measured metrics of the performance metadata for the sample source data. One skilled in the art will recognize that any number of analytical and/or statistical algorithms may be used to generate the estimated performance metadata for the source data, filters, and aggregations without departing from these embodiments.

Although a specific process performed by the interest-driven business intelligence server system to determine of the estimated performance metadata for the source data is illustrated in FIG. 11, any of a variety of processes can be utilized in accordance with embodiments of the invention.

Figure 12:
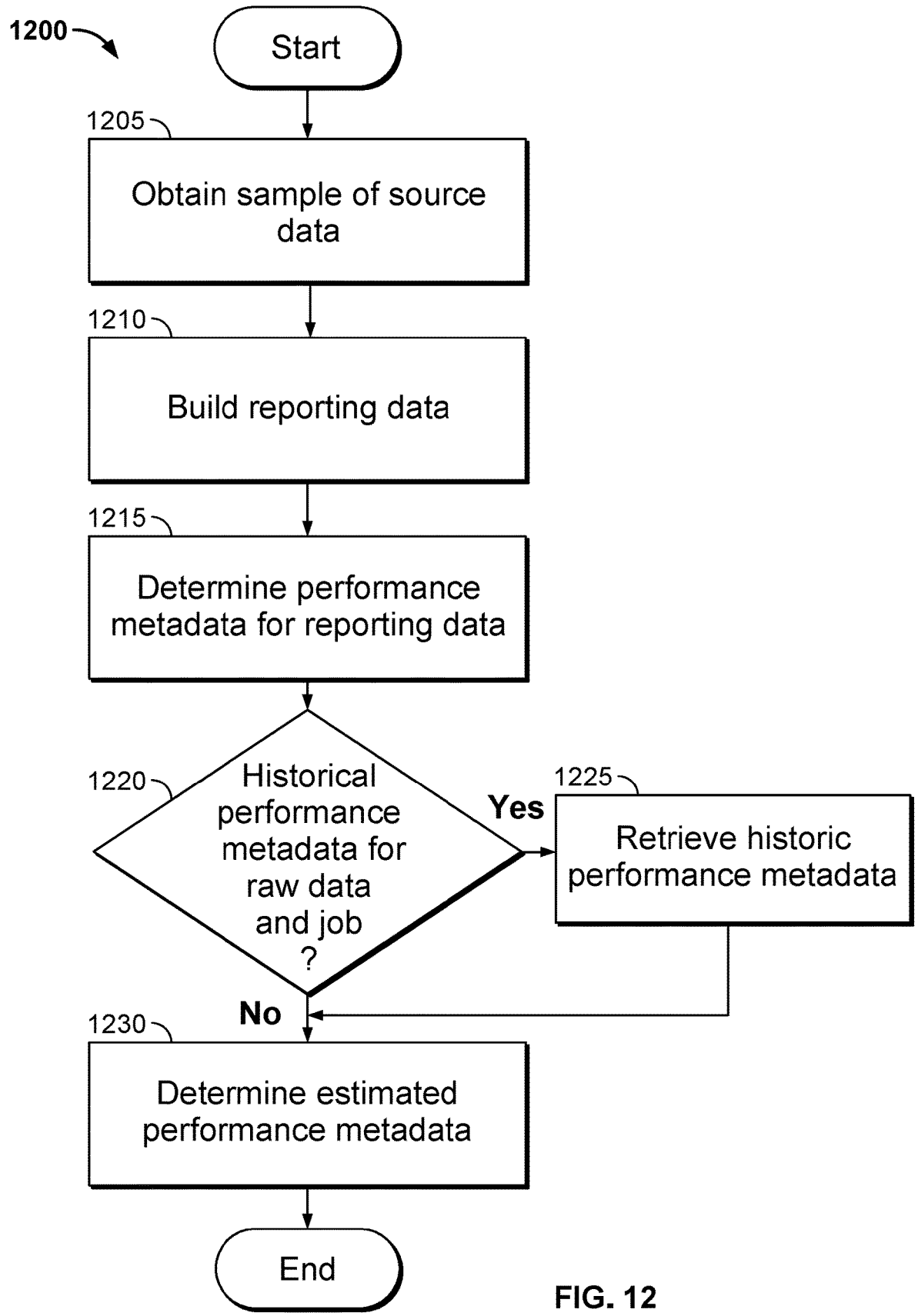
FIG. 12 is a flow diagram illustrating a process for determining performance metadata pertaining to reporting data in the interest-driven data pipeline performed by an interest-driven business intelligence server system in accordance with embodiments of this invention.

Once a sample of the source data is available, a sample of the reporting data may be generated. The performance metadata for the sample of reporting data may be used to generate estimated performance metadata for the reporting data satisfying received reporting data requirements. A process for determining a sample set of the reporting data and the estimated performance metadata for the reporting data in accordance with embodiments of this invention is shown in FIG. 12. In process 1200, the interest-driven business intelligence server system obtains the sample of source data (1205); builds a sample of the reporting data from the reporting data requirements and the sample of source data based upon the reporting requirements (1210); determines the performance metadata for the building of the sample reporting data (1215); retrieves historical performance metadata for the reporting data if available (1225) and generates estimated performance metadata for the reporting data (1230).

In accordance with many embodiments, the obtained (1205) sample of source data includes a source data schema defining the dimensions and facts of the obtained sample source data. In a number of embodiments, the obtained sample of source data includes metadata describing the data sources from which the sample of source data was obtained.

In a number of embodiments, building (1210) a sample of the reporting data includes combining the source data schema of the sample of source data with the reporting data schemas defining the reporting data and/or source data to create reporting data. The created reporting data has a reporting data schema that fulfills a reporting data schema determined using the received reporting data requirements. Building (1210) the sample of the reporting data then includes retrieving the data corresponding to the new reporting data schema from the sample of the source data. In a variety of embodiments, the sample of the reporting data built (1210) is a materialized data mart. Materialized data marts in accordance with several embodiments of the invention are relational databases containing data fulfilling the reporting data requirements; the materialized data marts can be queried like any other relational database and used to create additional reporting data. In many embodiments, building (1210) the sample reporting data includes combining files associated with the existing reporting data and/or the sample of source data. In a variety of embodiments, data stored in materialized data marts is aggregated and/or filtered to create additional data stored in the materialized data mart. In several embodiments, data stored in multiple data marts can be combined in order to create new sample reporting data. The performance metadata for the sample of the reporting data is determined from monitoring the generation of the sample of the reporting data and/or analyzing the sample of the reporting data (1215). Therefore, a complete discussion of how the metrics are determined is omitted for brevity.

Process 1200 determines whether any historical performance metadata is available for the reporting data (1220). If so, the historical performance metadata is retrieved (1225). The historical performance metadata may be stored in metadata accessible by the interest-driven business intelligence server system; may be stored in a separate memory accessible by the interest-driven business intelligence system; or may be generated from a stored snap shot of previous source data or previously stored source data. Other methods of obtaining the historical performance metadata may be used without departing from this invention. Estimated performance metadata for the sample reporting is then generated from the determined metrics of the sample reporting data, (1230). The estimated performance metadata may be generated based upon the historical performance metadata if available in some embodiments. The estimated performance metadata may be determined by extrapolation of the performance metadata for the sample reporting data in some embodiments. One skilled in the art will recognize that any number of analytical and/or statistical algorithms may be used to generate the estimated performance metadata for the reporting data without departing from these embodiments.

Although a specific process performed by the interest-driven business intelligence server system to determine of the estimated performance metadata for the reporting data is illustrated in FIG. 12, any of a variety of processes can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven business intelligence server system, comprising:
   a processor;
   a memory connected to the processor and configured to store an interest-driven business intelligence application;
   raw data storage configured to store raw data, wherein a portion of the raw data comprises unstructured data;
   metadata storage configured to store data description metadata describing the raw data; and
   report storage configured to store previously generated reports comprising previous reporting data and previous reporting data requirements;
   wherein the interest-driven business intelligence application configures the processor to:
      receive a report specification, wherein the report specification comprises at least one reporting data requirement;

generate a sample of source data satisfying the at least one reporting data requirement from a sample of the raw data;

determine estimates of performance metadata information for an interest-driven data pipeline that is utilized to generate reporting data based at least in part on the report specification and the data description metadata describing the raw data, wherein the estimates of performance metadata information comprise an estimated data size of reporting data, wherein the determining of the performance metadata information satisfies the at least one reporting data requirement, and wherein the determining of the estimates of performance metadata information comprises to:

apply required filters to the sample of the raw data;

apply required aggregations to the sample of the raw data;

determine performance metadata for the sample of source data, wherein the performance metadata includes performance metadata for the required aggregations and required filters and the required aggregations; and determine the estimates of performance metadata for the sample of reporting data satisfying the at least one reporting data requirement based on the determined performance metadata of the sample of source data;

wherein the performance metadata includes performance metadata for the required aggregations and required filters and the required aggregations provide the estimates of the performance metadata information for the interest-driven data pipeline to an interest-driven user visualization system, wherein the interest-driven user visualization system displays the estimated data size of the reporting data;

generate the reporting data utilizing the interest-driven data pipeline; and store the reporting data and the at least one reporting data requirement in the report storage.

2. The system of claim 1, wherein the estimates of the performance metadata information for the interest-driven data pipeline provided to the interest-driven user visualization system includes performance metadata for at least one of the raw data, the reporting data, and a source data of the interest-driven data pipeline.

3. The system of claim 1, wherein the estimates of the performance metadata information for the interest-driven data pipeline provided to the interest-driven user visualization system includes historical performance metadata for the interest-driven data pipeline.

4. The system of claim 3, wherein the interest-driven business intelligence application configures the processor to retrieve the historical performance metadata from one of metadata accessible by the interest-driven business intelligence server system and a memory storing the historical performance metadata for the interest-driven data pipeline.

5. The system of claim 1, wherein:

the interest-driven business intelligence application obtains the sample of the raw data by configuring the processor to:

generate a mini job that is an ETL processing job that extracts a sufficient amount of data to provide an accurate sample of the raw data available;

provide the mini job to a distributed storage system; and receive the sample of the raw data from the distributed storage system in response to the mini job; and wherein the performance metadata for the sample of the raw data includes performance metadata for the mini job and the estimates of the performance metadata includes estimates for an ETL processing job for obtaining the raw data to satisfy the at least one reporting data requirement.

6. The system of claim 5, wherein:

the interest-driven business intelligence application determines estimates of performance metadata for the raw data satisfying the at least one reporting data requirement by configuring the processor to retrieve historical performance metadata for the raw data satisfying the at least one reporting data requirement; and the historical performance metadata is used to determine the estimates of the performance metadata for the raw data satisfying the at least one reporting data requirement.

7. The system of claim 1, wherein:

the interest-driven business intelligence application determines the estimates of performance metadata for the source data satisfying the at least one reporting data requirement by configuring the processor to retrieve historical performance metadata for source data satisfying the at least one reporting data requirement; and wherein the historical performance metadata is used to determine the estimates of the performance metadata for the source data satisfying the at least one reporting data requirement.

8. The system of claim 1, wherein the interest driven data sharing application configures the processor to:

obtain the sample of source data satisfying the at least one reporting data requirement;

build a sample of reporting data satisfying the at least one reporting data requirement from the sample of source data;

determine performance metadata for the sample of reporting data; and determine estimates of performance metadata for the sample of reporting data satisfying the at least one reporting data requirement based on the determined performance metadata of the sample of source data.

9. The system of claim 8, wherein the interest-driven business intelligence application determines estimates of performance metadata for the reporting data satisfying the at least one reporting data requirement by configuring the processor to:

retrieve historical performance metadata for the reporting data satisfying the at least one reporting data requirement; and wherein the historical performance metadata is used to determine the estimates of the performance metadata for the reporting data satisfying the at least one reporting data requirement.

10. The system of claim 1, wherein the interest-driven data pipeline includes transformation processes that transform a set of raw data into a set of reporting data and intermediate sets of data generated by the transformation processes.

11. The system of claim 1, wherein the interest-driven business intelligence application configures the processor to receive a modified report specification after the display of the size of the reporting data, wherein the modified report specification comprises a modification to the at least one reporting data requirement.

12. The system of claim 11, wherein the reporting data is generated based at least in part on the modified report specification.

13. A method performed by an interest-driven business intelligence server system to provide performance metadata for an interest-driven data pipeline comprising:

receiving a report specification using an interest-driven business intelligence server system, wherein the report specification comprises at least one reporting data requirement;

generating a sample of source data satisfying the at least one reporting data requirement from a sample of raw data;

determining estimates of performance metadata information for an interest-driven data pipeline that is utilized to generate reporting data based at least in part on the report specification and data description metadata describing the raw data, wherein a metadata storage stores the data description metadata describing the raw data, wherein a raw data storage stores the raw data, wherein a portion of the raw data comprises unstructured data, and wherein the estimates of performance metadata information comprise an estimated data size of reporting data, wherein the determining of the performance metadata information satisfies the at least one reporting data requirement, and wherein the determining of the estimates of performance metadata information comprises:

applying required filters to the sample of the raw data;

applying required aggregations to the sample of the raw data;

determining performance metadata for the sample of source data, wherein the performance metadata includes performance metadata for the required aggregations and required filters and the required aggregations; and determining the estimates of performance metadata for the sample of reporting data satisfying the at least one reporting data requirement based on the determined performance metadata of the sample of source data;

providing the estimates of the performance metadata information for the interest-driven data pipeline to an interest-driven user visualization system, wherein the interest-driven user visualization system displays the estimated data size of the reporting data;

generating the reporting data utilizing the interest-driven data pipeline, and storing the reporting data and the at least one reporting data requirement in a report storage wherein the report storage stores previously generated reports comprising previous reporting data and previous reporting data requirements.

14. The method of claim 13, further comprising:

generating a mini job that is an ETL processing job that extracts a sufficient amount of data to provide an accurate sample of the raw data available using the interest-driven business intelligence server system;

providing the mini job to a distributed storage system using the interest-driven business intelligence server system; and receiving the sample of raw data from the distributed storage system in response to the mini job using the interest-driven business intelligence server system;

wherein the performance metadata for the sample of raw data includes performance metadata for the mini job and the estimates of the performance metadata includes estimates for an ETL processing job for obtaining raw data to satisfy the at least one reporting data requirement.

* * * * *

UNITED STATES PATENT AND TRADEMARK OFFICE
CERTIFICATE OF CORRECTION

PATENT NO. : 10,540,363 B2
APPLICATION NO. : 15/223113
DATED : January 21, 2020
INVENTOR(S) : John Schuster et al.

Page 1 of 1

It is certified that error appears in the above-identified patent and that said Letters Patent is hereby corrected as shown below:

In the Specification

In Column 19, Line(s) 46 & 47, delete "snap shot" and insert --snapshot--, therefor.

In Column 20, Line(s) 35, delete "snap shot" and insert --snapshot--, therefor.

In Column 23, Line(s) 3 & 4, delete "snap shot" and insert --snapshot--, therefor.

In Column 24, Line(s) 18, delete "snap shot" and insert --snapshot--, therefor.

In the Claims

In Column 28, Line(s) 14, Claim 13, after "storage", insert --,--.

Signed and Sealed this
Eighth Day of December, 2020

Andrei Iancu
*Director of the United States Patent and Trademark Office*